United States Patent
Deogun et al.

(10) Patent No.: US 12,389,249 B2
(45) Date of Patent: *Aug. 12, 2025

(54) TECHNIQUES FOR MEASURING SYNCHRONIZATION SIGNAL BLOCKS IN WIRELESS COMMUNICATIONS

(71) Applicant: QUALCOMM Incorporated, San Diego, CA (US)

(72) Inventors: Pravjyot Singh Deogun, Bengaluru (IN); Ozcan Ozturk, San Diego, CA (US); Jing Sun, San Diego, CA (US); Xiaoxia Zhang, San Diego, CA (US); Kapil Bhattad, Bangalore (IN); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,882

(22) Filed: Sep. 26, 2022

(65) Prior Publication Data

US 2023/0018838 A1  Jan. 19, 2023

Related U.S. Application Data

(63) Continuation of application No. 16/820,381, filed on Mar. 16, 2020.

(30) Foreign Application Priority Data

Mar. 28, 2019 (IN) .............................. 201941012234
Apr. 15, 2019 (IN) .............................. 201941015042

(51) Int. Cl.
*H04W 24/08* (2009.01)
*H04B 17/318* (2015.01)
*H04W 56/00* (2009.01)

(52) U.S. Cl.
CPC .......... *H04W 24/08* (2013.01); *H04B 17/318* (2015.01); *H04W 56/0005* (2013.01)

(58) Field of Classification Search
CPC ............. H04W 24/08; H04W 56/0005; H04W 36/0085; H04W 56/0015; H04W 72/04;
(Continued)

(56) References Cited

U.S. PATENT DOCUMENTS 11,177,869 B2  11/2021 Hwang et al.
11,197,302 B2  12/2021 Cheng et al.
(Continued)

FOREIGN PATENT DOCUMENTS

| CN | 109257957 A | 1/2019 |
| CN | 109474938 A | 3/2019 |
| WO | 2018202157 A1 | 11/2018 |

OTHER PUBLICATIONS

Huawei., et al., "On QCL Indication and Time Repetition of SS Blocks", R1-1715565, 3GPP TSG RAN WG1 Meeting NR#3, Nagoya, Japan, Sep. 18-21, 2017, 2 Pages.
(Continued)

*Primary Examiner* — Peter P Chau
(74) *Attorney, Agent, or Firm* — ArentFox Schiff LLP

(57) ABSTRACT

Aspects described herein relate to receiving multiple synchronization signal blocks (SSBs) from a cell over a measurement time window, identifying, for each SSB in a subset of the multiple SSBs, a repeating beam index, where the identifying, for each SSB, the repeating beam index is based at least in part on a repeat parameter indicating a number of beams in a SSB pattern for the cell, and associating two or more SSBs of the subset of the multiple SSBs having the same repeating beam index as having a same measurement.

30 Claims, 10 Drawing Sheets

(58) Field of Classification Search
CPC .. H04B 17/318; H04B 7/0632; H04B 7/0695; H04B 7/024
See application file for complete search history.

(56) References Cited

U.S. PATENT DOCUMENTS

| | | | |
|---|---|---|---|
| 11,223,967 B2 | 1/2022 | Lee et al. | |
| 2017/0171786 A1* | 6/2017 | Mochizuki | H04W 48/20 |
| 2018/0302819 A1 | 10/2018 | Lee et al. | |
| 2018/0324023 A1 | 11/2018 | Zeng et al. | |
| 2018/0324678 A1 | 11/2018 | Chen et al. | |
| 2019/0045559 A1* | 2/2019 | Huang | H04B 17/318 |
| 2019/0386757 A1 | 12/2019 | Li et al. | |
| 2020/0120634 A1 | 4/2020 | Lee et al. | |
| 2020/0128412 A1* | 4/2020 | Kazmi | H04B 7/088 |
| 2020/0275523 A1 | 8/2020 | Zhang et al. | |
| 2020/0314673 A1 | 10/2020 | Deogun et al. | |
| 2020/0396744 A1 | 12/2020 | Xiong et al. | |
| 2021/0022096 A1 | 1/2021 | Rane et al. | |
| 2021/0136828 A1 | 5/2021 | Hakola et al. | |
| 2021/0235456 A1 | 7/2021 | Xu et al. | |
| 2021/0345299 A1 | 11/2021 | Gao et al. | |
| 2021/0377883 A1 | 12/2021 | Jung et al. | |
| 2021/0377890 A1* | 12/2021 | Shen | H04L 5/005 |

OTHER PUBLICATIONS

International Preliminary Report on Patentability—PCT/US2020/023180 The International Bureau of WIPO—Geneva, Switzerland, Oct. 7, 2021.
International Search Report and Written Opinion—PCT/US2020/023180—ISA/EPO—Sep. 24, 2020.
Mediatek Inc: "Remaining Issues on Initial Access Procedure For Nr-U Operation", R1-2000438, 3GPP TSG RAN WG1 #100, e-Meeting, Feb. 24-Mar. 6, 2020, pp. 1-4.
Nokia, et al., "On Enhancements to Initial Access Procedures for Nr-U", 3GPP Draft, R1-1902125, 3GPP TSG RAN WG1 Meeting #96, Enhancements to Initial Access Procedures, 3rd Generation Partnership Project (3GPP), Mobile Competence Centre, 650, Route Des Lucioles, F-06921, Sophia-Antipolis, Cedex, France, vol. RAN WG1, No. Athens, Greece, Feb. 25, 2019-Mar. 1, 2019, Feb. 15, 2019 (Feb. 15, 2019), XP051599820, 16 Pages.
Partial International Search Report—PCT/US2020/023180—ISA/EPO—Jun. 8, 2020.
Vivo: "Support Beam Operation for RRM Measurement", 3GPP Draft, R2-1702942_Support beam operation for RRM measurement, 3GPP TSG RAN WG2 Meeting #97bis, 3rd Generation Partnership Project (3GPP), Mobile Competence Centre, 650, Route Des Lucioles, F-06921 Sophia-Antipolis Cedex, France, vol. Ran WG2, No. Spokane, USA, Apr. 3, 2017-Apr. 7, 2017, Mar. 25, 2017, XP051254341, 2 pages.

* cited by examiner

TECHNIQUES FOR MEASURING SYNCHRONIZATION SIGNAL BLOCKS IN WIRELESS COMMUNICATIONS

CLAIM OF PRIORITY UNDER 35 U.S.C. § 119

The present Application for Patent is a continuation of patent application Ser. No. 16/820,381, entitled "TECHNIQUES FOR MEASURING SYNCHRONIZATION SIGNAL BLOCKS IN WIRELESS COMMUNICATIONS" filed Mar. 16, 2020, which claims priority to Indian Patent Application No. 201941012234, entitled "TECHNIQUES FOR MEASURING SYNCHRONIZATION SIGNAL BLOCKS IN WIRELESS COMMUNICATIONS" filed Mar. 28, 2019, and Indian Patent Application No. 201941015042, entitled "TECHNIQUES FOR MEASURING SYNCHRONIZATION SIGNAL BLOCKS IN WIRELESS COMMUNICATIONS" filed Apr. 15, 2019, which are assigned to the assignee hereof and hereby expressly incorporated by reference herein for all purposes.

BACKGROUND

Aspects of the present disclosure relate generally to wireless communication systems, and more particularly, to communications related to synchronization signal blocks (SSBs).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, base stations can transmit SSBs to allow devices, such as user equipment (UEs) to determine timing synchronization to the base station and establish communications therewith. UEs can additionally report measurements of the SSBs to a serving cell for determining a target cell for handover. In wireless communication technologies that use a listen-before-talk (LBT) mechanism, the SSBs may be transmitted asynchronously and/or in bursts. Without decoding broadcast information, it may be difficult for the UE to determine certain information about the SSBs for reporting to the serving cell.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes receiving multiple synchronization signal blocks (SSBs) from a target cell over a measurement time window, identifying a repeating beam index for one or more of the multiple SSBs, where identifying the repeating beam index is based at least in part on a determination of a repeat parameter indicating a number of beams in a SSB pattern for the target cell, associating a beam set of the one or more of the multiple SSBs determined to have the same repeating beam index, measuring one or more parameters of the one or more of the multiple SSBs of the beam set, and reporting, to a serving cell, a measurement of the one or more parameters of beam set for the target cell.

In another example, a method for wireless communications is provided. The method includes receiving, from a user equipment (UE) at a serving cell, a reporting of a measurement of one or more parameters of a beam set of a target cell, and processing, by the serving cell, the measurement for determining whether to handover the UE to the target cell based at least in part on whether a repeat parameter, for determining a repeating beam index, is determinable by the UE.

In another example, a method for wireless communication is provided. The method includes configuring a number of SSBs for transmitting based on different beams, determining that the number of SSBs is not a factor of a configured value, and transmitting one or more of the number of SSBs as one or more additional beams to achieve a new number of beams that is the factor of the configured value.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

In an example, an apparatus for wireless communication is provided that includes a transceiver, a memory configured to store instructions, and one or more processors communicatively coupled with the transceiver and the memory. The one or more processors are configured to receive multiple SSBs from a target cell over a measurement time window, identify a repeating beam index for one or more of the multiple SSBs, where identifying the repeating beam index is based at least in part on a determination of a repeat parameter indicating a number of beams in a SSB pattern for the target cell, associate a beam set of the one or more of the multiple SSBs determined to have the same repeating beam index, measure one or more parameters of the one or more of the multiple SSBs of the beam set, and report, to a serving cell, a measurement of the one or more parameters of beam set for the target cell.

In an example, an apparatus for wireless communication is provided that includes a transceiver, a memory configured to store instructions, and one or more processors communicatively coupled with the transceiver and the memory. The one or more processors are configured to configure a number of SSBs for transmitting based on different beams, determine that the number of SSBs is not a factor of a configured value, and transmit one or more of the number of SSBs as one or more additional beams to achieve a new number of beams that is the factor of the configured value.

According to an aspect, a method for wireless communication is provided that includes receiving multiple synchronization signal blocks (SSBs) from a cell over a measurement time window, identifying, for each SSB in a subset of the multiple SSBs, a repeating beam index, where the identifying, for each SSB, the repeating beam index is based at least in part on a repeat parameter indicating a number of beams in a SSB pattern for the cell, and associating two or more SSBs of the subset of the multiple SSBs having the same repeating beam index as having a same measurement.

In another aspect, an apparatus for wireless communication is provided that includes a transceiver, a memory configured to store instructions, and one or more processors communicatively coupled with the transceiver and the memory. The one or more processors are configured to receive multiple SSBs from a cell over a measurement time window, identify, for each SSB in a subset of the multiple SSBs, a repeating beam index, where the identifying, for each SSB, the repeating beam index is based at least in part on a repeat parameter indicating a number of beams in a SSB pattern for the cell, and associate two or more SSBs of the subset of the multiple SSBs having the same repeating beam index as having a same measurement.

In another aspect, an apparatus for wireless communication is provided that includes means for receiving multiple SSBs from a cell over a measurement time window, means for identifying, for each SSB in a subset of the multiple SSBs, a repeating beam index, where the identifying, for each SSB, the repeating beam index is based at least in part on a repeat parameter indicating a number of beams in a SSB pattern for the cell, and means for associating two or more SSBs of the subset of the multiple SSBs having the same repeating beam index as having a same measurement.

In another aspect, a non-transitory computer-readable medium is provided that includes code executable by one or more processors for wireless communication. The code includes code for receiving multiple SSBs from a cell over a measurement time window, identifying, for each SSB in a subset of the multiple SSBs, a repeating beam index, where the identifying, for each SSB, the repeating beam index is based at least in part on a repeat parameter indicating a number of beams in a SSB pattern for the cell, and associating two or more SSBs of the subset of the multiple SSBs having the same repeating beam index as having a same measurement.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
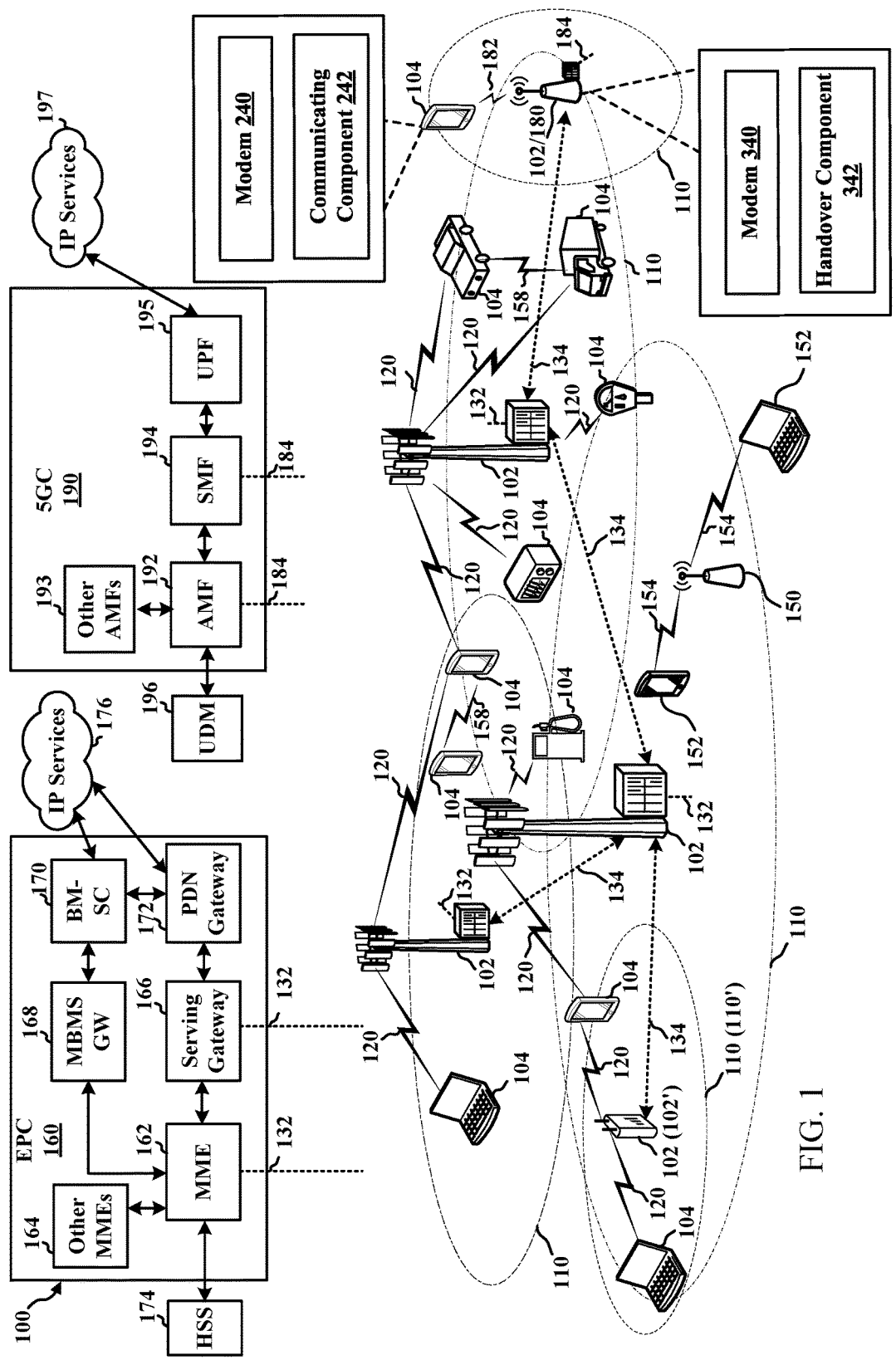
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to mechanisms for determining certain parameters from which synchronization signal block (SSB) information can be derived in reporting measurements and/or filtering measurement information for one or more SSBs. For example, a repeat parameter can be defined to indicate a number of SSBs in a measurement time window before the beams are repeated. From this parameter, and given a beam index that can be identified in the beam, a repeated beam index can be determined to distinguish beams that are repeated in the measurement time window. Given this information, measurement reporting can include measurements related to the beam set of beams with the same repeated beam index, such as an average measurement among the beams, a maximum measurement among the beams, a measurement of a randomly selected beam, etc. When this information (e.g., the repeat parameter) is not known or determinable, and thus the repeated beam index cannot be determined, SSB measurement information can be separately reported for the base station to determine processing thereof, and/or the repeat parameter can be hypothesized with multiple beam measurements being provided based on different repeat parameter hypotheses. Additionally, a base station can provide parameters related to beam based reporting triggers for reporting the SSB measurement information. Moreover, the base station can provide parameters related to measurement and reporting SSB measurements for target cells that are asynchronously timed with respect to the base station (e.g., such that a measurement timing window is different than that specified by the base station for measuring SSBs).

In certain specific examples, a wireless communication technology, such as fifth generation (5G) new radio (NR), a SSB-based measurement timing configuration (SMTC) window can be defined for measuring SSBs of one or more target cells. Each SMTC window can have a fixed duration (e.g., 8 milliseconds (ms)) and can be periodic in time. An SMTC window can include candidate SSB positions where SSBs can be transmitted. A base station, such as a gNB, can opportunistically transmit SSB bursts (e.g., set of continuous SSBs) within each SMTC window based on whether a listen-before-talk (LBT) performed to acquire a channel for communication is successful. Each SSB can include one or more of a primary synchronization signal (PSS), secondary synchronization signal (SSS), physical broadcast channel (PBCH), demodulation reference signal (DM-RS) (e.g., for the PBCH), etc. PSS and SSS can be used to indicate physical cell identifier. PBCH DM-RS sequence and PBCH can indicate the SSB index that can be used for timing acquisition and beam identification and can be used for performing measurements and reporting results to serving base station. It may be desirable, however, for a user equipment (UE) to not decode PBCH of every detected neighbor cell for radio resource management (RRM) measurement, such to reduce UE complexity and resource consumption. In addition, it may be desirable to support asynchronous cell deployment (e.g., where SMTCs window of neighbor cells may not be synchronized with one another and/or with the serving cell).

In a specific example, a wireless communication technology can define (e.g., and/or a gNB operating in compliance with the wireless communication technology can define) a number, N, of SSB occasions, where N is a positive integer, available within a SMTC window. The wireless communication technology can also define a fixed mapping of SSB index to SSB occasions within an SMTC window. SSB_index=0 can be mapped to a first SSB occasion, SSB_index=1 can be mapped to a second SSB occasion, and so on. SSB index can be determined by a UE by receiving PBCH DM-RS sequence and PBCH payload associated with an SSB. In an example, for a given SSB occasion, SSB_index=8*PBCH_payload+DM-RS sequence. In 5G NR, for example and based on the above, a pattern of PBCH DM-RS sequences can repeat after every 8 SSB occasions, and PBCH payload can indicate the cycle number of PBCH DM-RS sequence. In this example, PBCH DM-RS sequence can be represented by an index of 0-7, and PBCH payload can be presented by 0 or 1 depending on the cycle. More generally, there can be a fixed mapping of beams with SSB occasions within an SMTC window, and SSB beam pattern can repeat after every Q SSB occasions (Q indicates number of beams), where Q can be the repeat parameter described herein. The beam index can be used to identify an SSB beam such that Beam_index=SSB_index modulo Q. Beam index value of a beam may be used by UE for RRM measurements of a cell, hence UE may require knowledge of Q value of cell to perform RRM measurements.

One possible issue is that, without knowing Q, the UE may need to acquire the value of Q of a measured cell by receiving full SSB index (and thus decoding PBCH) and/or acquiring remaining minimum system information (RMSI) of the measured cell. This may be avoided, however, by ensuring the UE can determine Q, without decoding PBCH or acquiring RMSI, or by allowing the UE to report measurements without knowing Q where the base station can still associate the measurements with corresponding SSBs, and/or the like, as described herein. This can decrease processing burden on the UE in determining information for reporting, to a serving cell, signal measurements of neighboring cells.

The described features will be presented in more detail below with reference to FIGS. 1-10.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for measuring and/or reporting measurement information for SSBs received from one or more cells. In addition, some nodes may have a modem 340 and handover component 342 for processing SSB measurement information to determine whether to handover a UE 104 or other purposes, etc., as described herein. Though a UE 104 is shown as having the modem 240 and communicating component 242 and a base station 102/gNB 180 is shown as having the modem 340 and handover component 342, this is one illustrative example, and substantially any node or type of node may include a modem 240 and communicating component 242 and/or a modem 340 and handover component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, neighboring base stations 102 of a base station 102 serving a UE 104 can transmit SSBs in certain measurement time windows, and communicating component 242 of the UE 104 can measure and/or report measurements of the SSBs as received at the UE 104. Communicating component 242 can report the measurements to its serving base station 102. In one example, where the UE 104 can determine a repeat parameter for the SSBs, the UE 104 may be able to determine a beam set of related SSBs in an SSB burst, and can accordingly report a measurement for the beam set. Where communicating component 242 cannot determine the repeat parameter, communicating component 242 can report the measurements with additional information to allow the serving base station 102 to determine an association among SSBs in the reported measurements. In any case, communicating component 242 may report the measurement information without necessarily decoding a broadcast channel (e.g., PBCH) to determine a repeating beam index of the SSB, as described further herein, which can reduce processing consumption and/or complexity at the UE 104. Handover component 342 can accordingly process received measurements based on whether the repeat parameter is determinable by the UE 104, as described further herein.

Turning now to FIGS. 2-10, aspects are depicted with reference to one or more components and one or more methods that may perform the actions or operations described herein, where aspects in dashed line may be optional. Although the operations described below in FIGS.

4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 2:
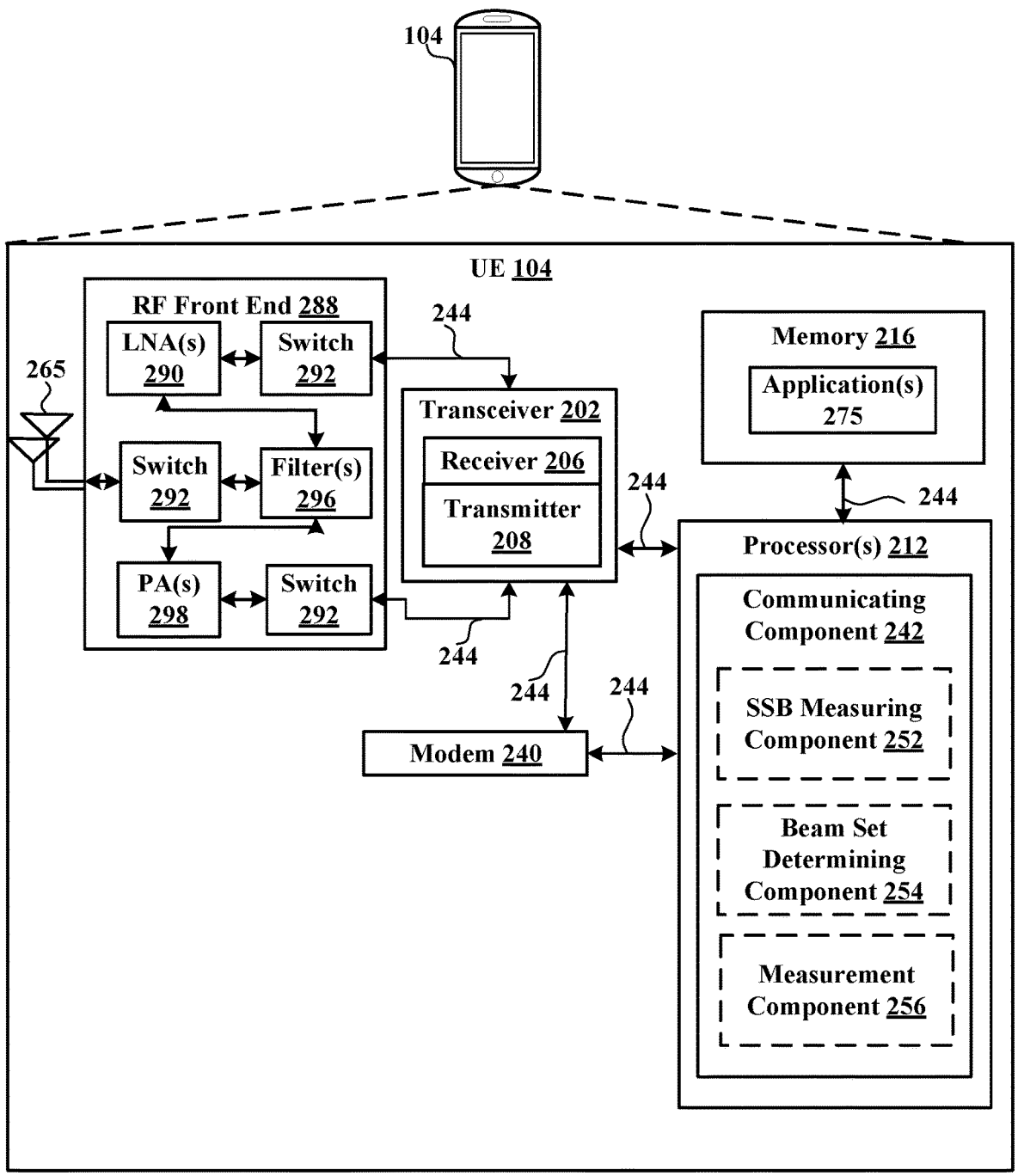
FIG. 2 is a block diagram illustrating an example of a UE, in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for measuring and/or reporting measurements of SSBs.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a SSB measuring component 252 for measuring SSBs transmitted by a target cell, a beam set determining component 254 for determining a beam set of one or multiple SSBs based on whether a repeat parameter is determinable (e.g., such to determine a repeating beam index and associating SSBs of the same repeating beam index), and/or a measurement component 256 for reporting measurement(s) of one or more parameters of one or more SSBs to a serving cell for processing.

In an aspect, the processor(s) 212 may correspond to one or more of the processors described in connection with the UE in FIG. 10. Similarly, the memory 216 may correspond to the memory described in connection with the UE in FIG. 10.

Figure 3:
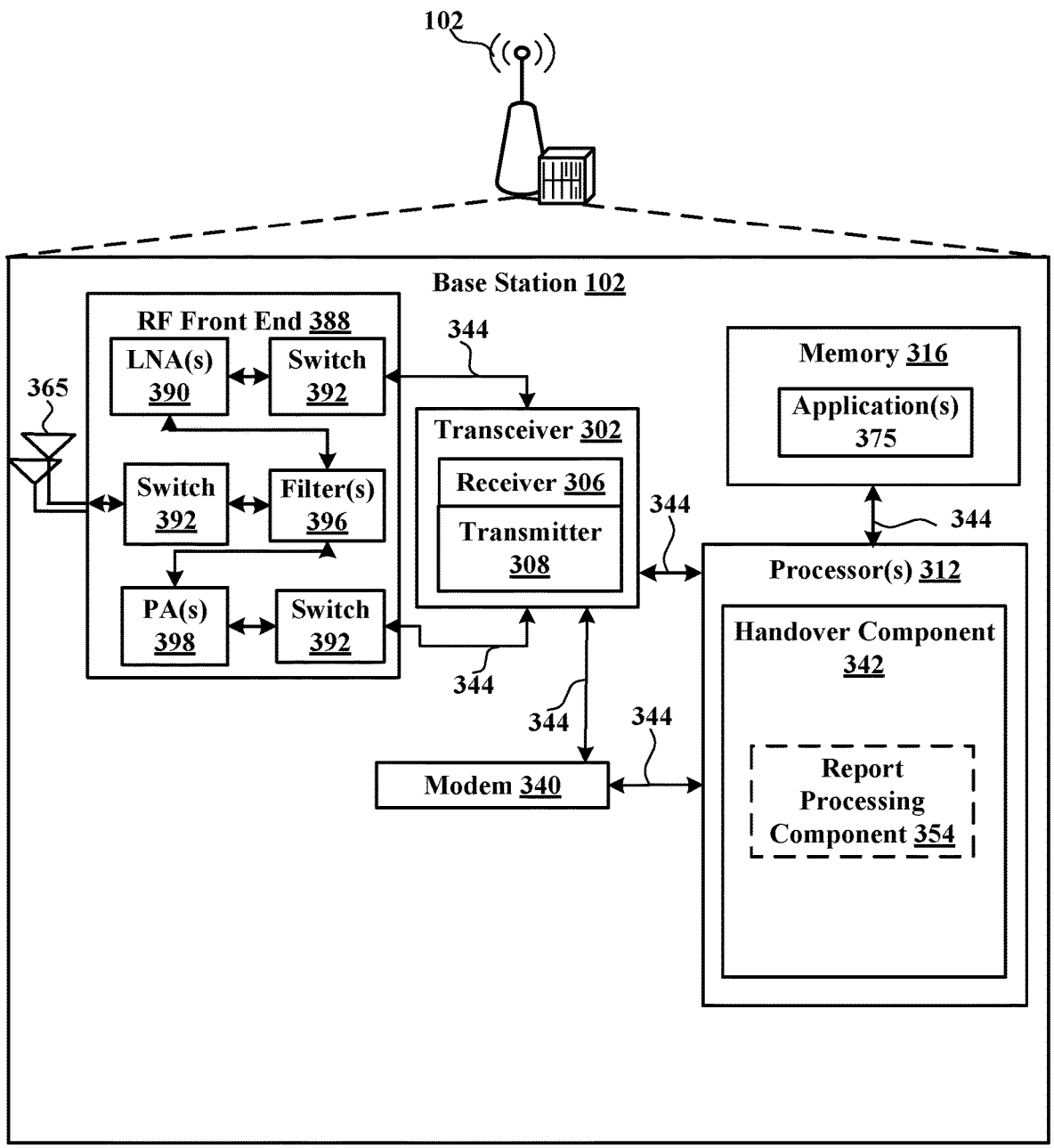
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and handover component 342 for processing measurement(s) of one or more parameters of one or more SSBs transmitted by a target cell, as measured by a UE, for determining whether to handover the UE.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, handover component 342 can optionally include a report processing component 354 for obtaining and processing a report of one or more measurements of one or more parameters of one or more SSBs, where processing of the report may be based on whether a repeat parameter defining a number of SSBs in a repeating pattern for an SSB burst is determinable by the UE.

In an aspect, the processor(s) 312 may correspond to one or more of the processors described in connection with the base station in FIG. 10. Similarly, the memory 316 may correspond to the memory described in connection with the base station in FIG. 10.

Figure 4:
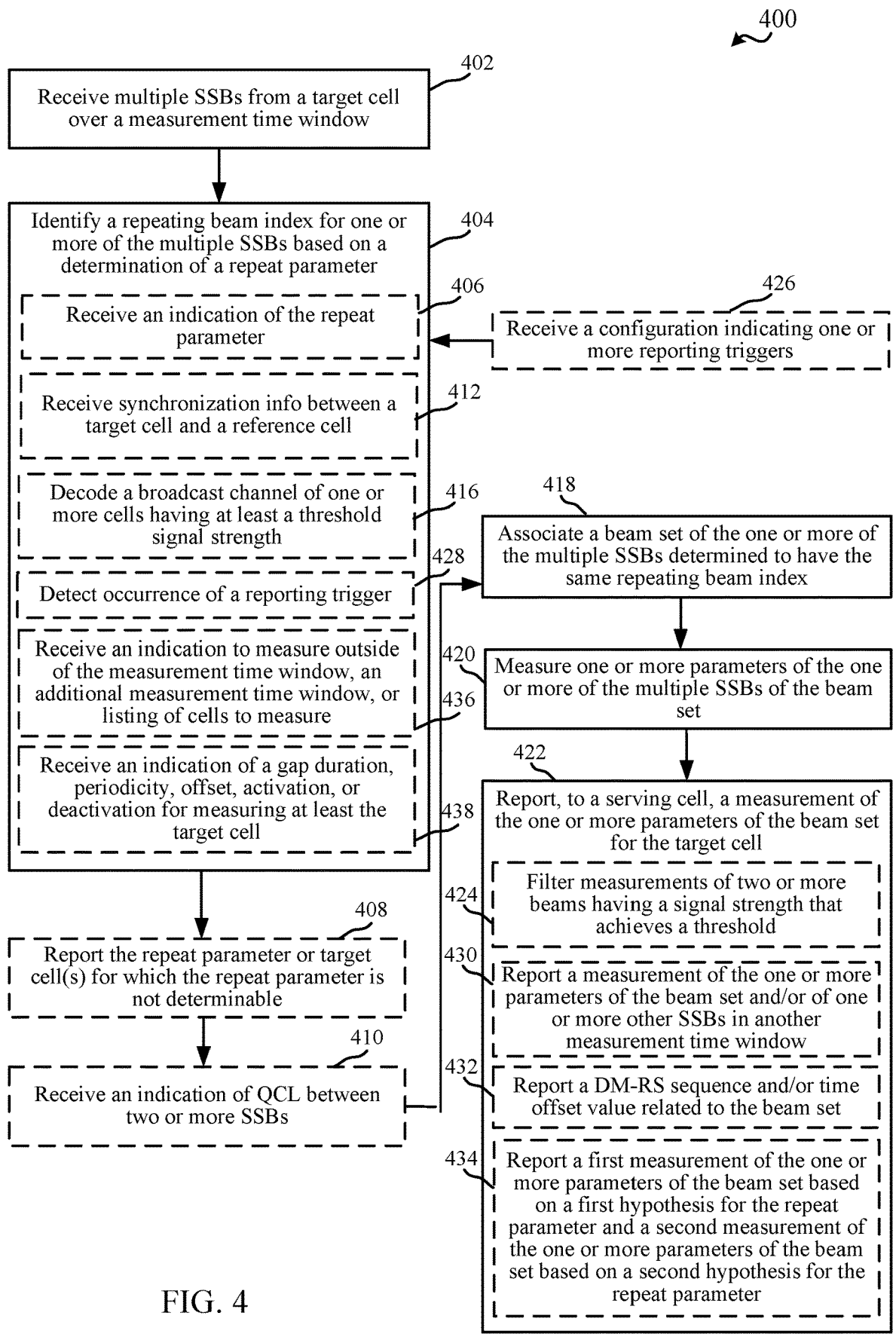
FIG. 4 is a flow chart illustrating an example of a method for receiving and measuring synchronization signal blocks (SSBs), in accordance with various aspects of the present disclosure.
Figure 5:
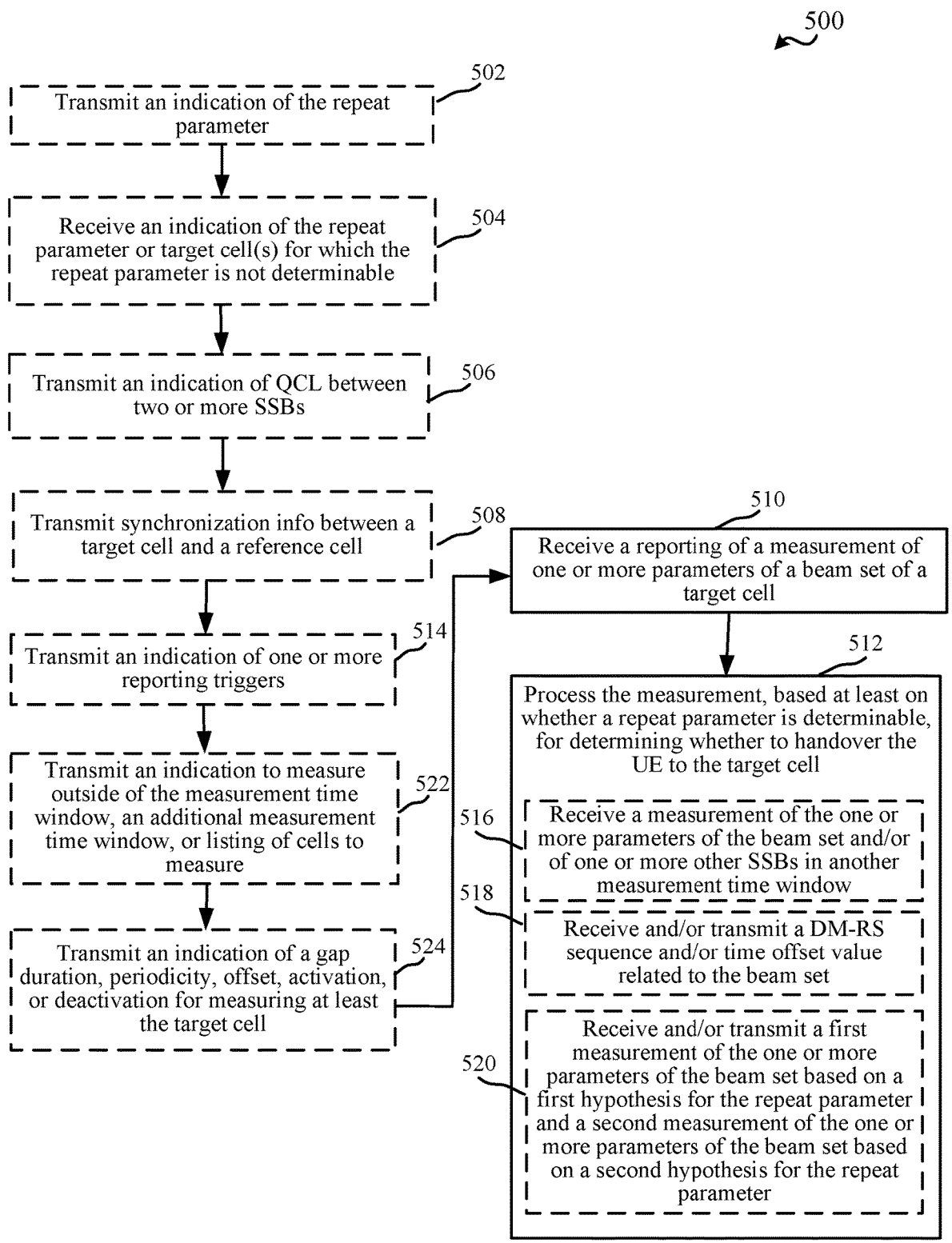
FIG. 5 is a flow chart illustrating an example of a method for processing SSB measurements, in accordance with various aspects of the present disclosure.

FIG. 4 illustrates a flow chart of an example of a method 400 for receiving and measuring SSBs from a target cell. FIG. 5 illustrates a flow chart of an example of a method 500 for processing SSB measurements from a UE to determine whether to handover the UE or for other purposes. Methods 400 and 500 are described in conjunction with one another for ease of explanation, though the methods 400 and 500 are not required to be performed in conjunction. In one example, a UE 104 can perform the functions described in method 400 using one or more of the components described in FIGS. 1 and 2. In one example, a base station 102 can perform the functions described in method 500 using one or more of the components described in FIGS. 1 and 3.

In method 400, at Block 402, multiple SSBs can be received from a target cell over a measurement time window. In an aspect, SSB measuring component 252, e.g., in conjunction with processor(s) 212, memory 216, transceiver 202, communicating component 242, etc., can receive the multiple SSBs from the target cell over the measurement time window. In one example, a serving cell can configure the measurement time window (e.g., a SMTC window) for the UE 104 to use in measuring SSBs transmitted by neighboring cells. For example, the serving cell can configure the measurement time window using radio resource control (RRC) signaling, dedicated signaling (e.g., over a downlink control channel), etc. to indicate one or more parameters related to the measurement time window, such as a start time, duration, etc. For example, the start time, duration, etc. can be in terms of a time division, such as one or more orthogonal frequency division multiplexing (OFDM) symbols, single-carrier frequency division multiplexing (SC-FDM) symbols, etc. In this example, the start time may include a symbol index of a symbol within a collection of symbols (e.g., a slot), an identifier of the slot, and/or the like, and the duration may be in terms of a number of symbols, a number of slots that include multiple symbols, etc. In another example, the measurement time window may be indicated based one or more parameters from which a duration, start time, etc. can be determined (e.g., from a reference time, a current time, and/or the like). Accordingly, SSB measuring component 252 can attempt to receive and measure SSBs during the measurement time window.

Figure 7:
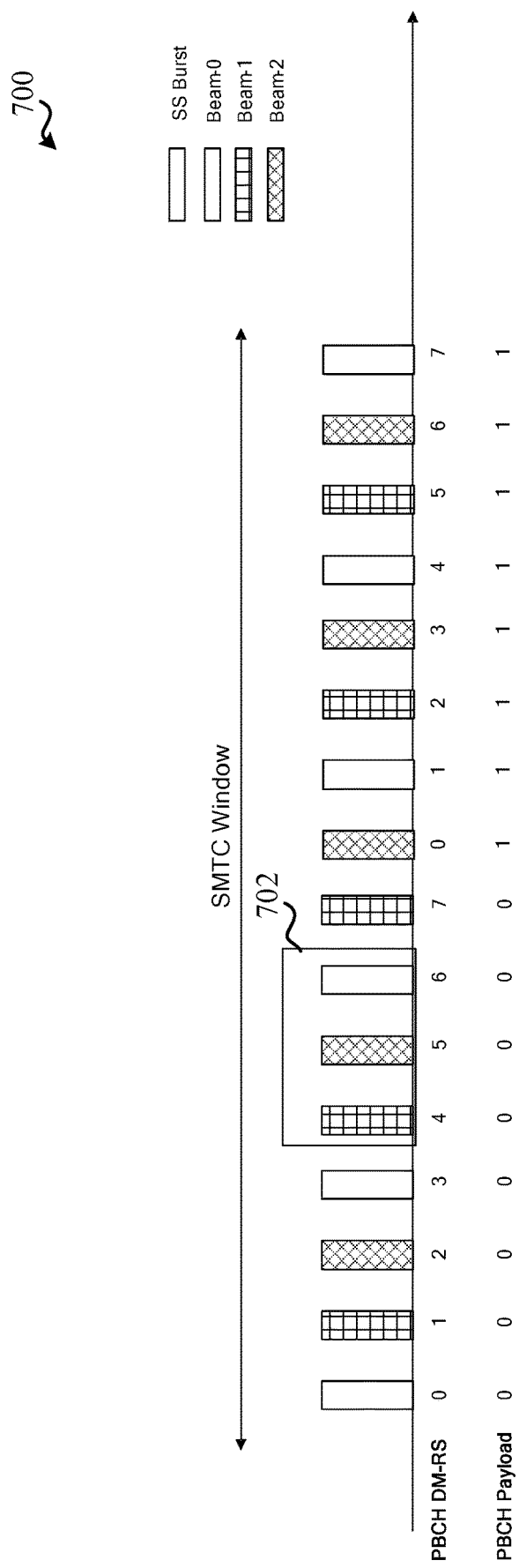
FIG. 7 illustrates an example of a SSB burst, in accordance with various aspects of the present disclosure.

In addition, as described, a given target cell can transmit multiple SSBs (e.g., once LBT is successful) in a SSB burst. The multiple SSBs may include multiple transmissions of multiple SSB beams in a patterned sequence. For example, for 3 SSB beams, the target cell can transmit the SSB beams in an order and repeat the order until the end of the SSB burst. Thus, the SSB beams may be transmitted multiple times in the SSB burst. An example is shown in FIG. 7 where 3 SSB beams can be transmitted in a burst 702 in a repeating pattern in a SSB occasion 700. In this example, the SSB burst 702 can include beam 1 followed by beam 2 followed by beam 0. Within the SMTC window, the SSBs may be considered to have an index that can correspond to the position of the SSB within the SMTC. As described, above, for example, this index can indicate a relative position of the SSB within the SMTC. In the depicted example, the SSB index may be determined based on SSB_index= 8*PBCH_payload+DM-RS_sequence.

A repetition factor (also referred to herein as the repeat parameter) can be defined and may correspond to the number of SSBs transmitted in a given instance of the pattern (e.g., the number of SSBs in the SSB burst 702 in FIG. 7. If this repetition factor is known or determinable by the UE 104, the UE 104 can associate the SSBs that are repeated according to a repeated beam index (e.g., 1, 2, or 3 in the example of FIG. 7). In this regard, for example, the UE 104, as described further herein, can associate measurements of SSBs having the same repeated beam index, and can accordingly provide a measurement of SSBs that considers the SSBs with the same repeated beam index as being associated with one another. If the repetition factor is not known or not determinable, the UE 104 may include additional information in SSB reporting to allow the serving cell to determine which measurements may be associated with a repeated beam, and/or the like, as described further herein.

In method 400, at Block 404, a repeating beam index for one or more of the multiple SSBs can be identified based on a determination of a repeat parameter. In an aspect, beam set determining component 252, e.g., in conjunction with processor(s) 212, memory 216, transceiver 202, communicating component 242, etc., can identify the repeating beam index for one or more of the multiple SSBs based on a determination of the repeat parameter. For example, beam set determining component 252 can determine the repeating beam index based on whether the repeat parameter is known or determinable or not. For example, where the repeat parameter is known or determined, beam set determining component 252 can determine the repeating beam index as the SSB index modulo Q, where Q is the repeat parameter. Where the repeat parameter is not known, beam set determining component 252 can determine the repeating beam index as the SSB index or other parameter or identification related to the SSB for reporting to the base station 102 with a corresponding measurement (e.g., and the base station 102 may determine the repeating beam index and/or other associated SSBs).

For RRM measurements, the UE 104 may be required to identify beam index of neighbor cells and signal strength of PSS/SSS. For NR-U interface (e.g., the NR interface between a UE 104 and base station 102), the UE 104 may not be able to determine the beam index of an SSB without PBCH decoding, such as where the value of Q (the repeat parameter) is not known to UE (e.g., the value of Q can be provided within PBCH or remaining minimum system information (RMSI)), or where Q is not a factor of 8. It is given that PBCH decoding of neighbor cells can increase UE burden for RRM measurements and may be avoided by using aspects described herein. Thus, examples for deriving the repeat parameter or reporting without knowing the repeat parameter are described herein.

In a specific example, identifying the repeating beam index at Block 404 can optionally include, at Block 406, receiving an indication of the repeat parameter. In an aspect, beam set determining component 254, e.g., in conjunction with processor(s) 212, memory 216, transceiver 202, communicating component 242, etc., can receive the indication of the repeat parameter from the serving cell, from the target cell, and/or the like. For example, the network (e.g., via base station 102 as a serving cell or target cell) can indicate to UE 104 about value of Q to allow UE to identify beam index using PBCH DM-RS. In one example, a measurement configuration received from the serving cell or target cell can include an indication of Q (the repeat parameter) for a list of cells. This may include multiple such lists and associated Q values. In an example, the list of cells can be an explicit list of cells within or across frequency, all cells operating in a frequency, etc. For example, beam set determining component 254 can receive the configuration or other indication of the repeating beam index from the serving cell or target cell via RRC signaling (e.g., broadcast RRC signaling, such as system information block (SIB) broadcast or dedicated RRC signaling), dedicated control signaling, etc., as described. In any case, for example, beam set determining component 254 can determine the repeat parameter based on the indication or one or more related parameters in the measurement configuration, list of cells, etc.

Additionally, in an example, in method 500, optionally at Block 502, an indication of the repeat parameter can be transmitted. In an aspect, handover component 342, e.g., in conjunction with processor(s) 312, memory 316, transceiver 302, etc., can transmit the indication of the repeat parameter (e.g., to the UE 104, as described above). For example, handover component 342 can transmit the indication of the repeat parameter to the UE 104 (and/or other UEs) in RRC signaling (e.g., broadcast or dedicated RRC signaling), dedicated control signaling, etc. In another example, base stations can communication indications of the repeat parameter among one another, and thus in an example handover component 342 can transmit an indication of the repeat parameter to other cells and/or receive an indication of the repeat parameter form other cells. In this regard, in method 500, optionally at Block 504, an indication of the repeat parameter can be received. In an aspect, handover component 342, e.g., in conjunction with processor(s) 312, memory 316, transceiver 302, etc., can receive the indication of the repeat parameter (e.g., from other cells). For example, signaling enhancements can allow network to acquire Q value of neighbor cells in this regard. In this example, inter-node signaling between gNBs include Q value used for operating cells.

In yet another example, the UE can be configured to report Q value for a set of cells, which can include the network configuring a list of cells for which UE reports the Q value and/or configuring UE to report Q value for cells for which Q is not indicated within measurement configuration. For example, receiving the indication of the repeat parameter or target cell(s) for which the repeat parameter is not determinable, at Block 504, may additionally or alternatively include handover component 342 receiving this information from UE 104.

For example, based on being configured by the network, in method 400, optionally at Block 408, the repeat parameter or target cell(s) for which the repeat parameter is not determinable can be reported. In an aspect, beam set determining component 254, e.g., in conjunction with processor(s) 212, memory 216, transceiver 202, communicating component 242, etc., can report one or more of the repeat parameter or target cell(s) for which the repeat parameter is not determinable. In this example, beam set determining component 254 can determine the repeat parameter based on signaling from the target cell or other cells, and can report the repeat parameter to the serving cell if it is determined. If not, beam set determining component 254 can report, to the serving cell, an identification of the target cell whose repeat parameter is not determined.

In an example, where the serving cell receives an indication of the repeat parameter (e.g., from a target cell or a UE regarding the target cell), handover component 342 can transmit the indication of that repeat parameter to another UE. In another example, as described, handover component 342 can transmit the indication of a repeat parameter configured in the serving cell, which may be the same for the target cell in some network configurations. In yet another example, handover component 342 can determine the repeat parameter for target cells in the indication received at Block 504 (e.g., based on requesting the repeat parameter from the target cell over a backhaul connection) and/or can notify the UE 104 or other UEs of the repeat parameter for the target cell. In any case, where the beam set determining component 254 can receive an indication of the repeat parameter for the target cell, beam set determining component 254 can use the repeat parameter to determine a repeating beam index for a SSB.

In another example, the repeat parameter may be determinable based on keeping the repeat parameter as a factor of number of PBCH DM-RS sequences (e.g., 1, 2, 4, or 8 if there are 8 PBCH DM-RS sequences) to allow the repeated beam index identification to be determinable based on the repeat parameter and without PBCH decoding. Where the repeat parameter is not a factor of number of PBCH DM-RS sequences, base station can perform multiple transmissions for a subset of SSB beams within the pattern to achieve the factor of 8, such as by transmitting a repetition of one or more of the SSB beams. For example, if the number of repeated beams is 3, the first beam (or another beam) can be retransmitted using the last SSB of the repeating pattern to arrive at a repeat parameter (i.e., repetition factor) of 4. In addition, in this example, the base station can indicate a quasi-colocation (QCL) relationship between the same SSBs (e.g., between the first and last SSB of the repeating pattern)

to allow the UE 104 to associate measurements of these SSBs as well, though within a set of beams.

In this example, in method 500, optionally at Block 506, an indication of QCL between two or more SSBs can be transmitted. In an aspect, handover component 342, e.g., in conjunction with processor(s) 312, memory 316, transceiver 302, etc., can transmit the indication of QCL between the two or more SSBs. Similarly, in method 400, optionally at Block 410, the indication of QCL between two or more SSBs can be received. In an aspect, beam set determining component 254, e.g., in conjunction with processor(s) 212, memory 216, transceiver 202, communicating component 242, etc., can receive the indication of QCL between the two or more SSBs. In one example, the information can be provided within RMSI or in handover command or measurement configuration from the serving cell. As described above and in further detail herein, the UE 104 may combine measurements of same beam transmissions (e.g., within a set of beams in a repeating pattern) and/or can use the information for receiving other downlink transmissions. If such information is not available, the UE 104 can assume that all SSBs within a pattern of Q SSBs correspond to different beams (for associating and/or reporting measurements, as described further herein). Further, to allow single SSB transmission per beam while keeping value of Q as a factor of number of PBCH DM-RS sequences, base station may not transmit at a subset of SSB positions within SMTC. In one example, serving base station may indicate the SSB positions or SSB indices which are not transmitted within a set of Q SSBs for a list of cells using measurement configuration or handover command. In another example, a cell may indicate the SSB positions or SSB indices which are not transmitted within a set of Q SSBs using system information. The UE receiving the information may determine, e.g., via beam set determining component 254, the SSB occasions within the SMTC which are not used for transmissions and may assume that no SSB is transmitted within the determined occasions and can use the time occasions for receiving other downlink signals or transmitting uplink signals.

In another example where the repeat parameter can be determinable, the network can indicate neighboring cells that have synchronized SSB occasions, and thus the UE 104 can determine target cell SSB occasions and associated SSB indices based on the timing of a reference cell and associated SSB information without decoding PBCH of the neighboring cells. In an example, in method 500, optionally at Block 508, synchronization information between a target cell and a reference cell can be transmitted. In an aspect, handover component 342, e.g., in conjunction with processor(s) 312, memory 316, transceiver 302, etc., can transmit (e.g., to one or more UEs via RRC signaling, dedicated control signaling, etc.) the synchronization information between the target cell and the reference cell. Similarly, in method 400, optionally at Block 412, synchronization information between a target cell and a reference call can be received. In an aspect, beam set determining component 254, e.g., in conjunction with processor(s) 212, memory 216, transceiver 202, communicating component 242, etc., can receive (e.g., from a base station via RRC signaling, dedicated control signaling, etc.) the synchronization information between the target cell and the reference cell. For example, the synchronization information may include one or more of an indication of synchronization between the target cell and the reference cell, an offset between a measurement window of the target cell and the reference cell, etc., and the UE 104 may know (or otherwise be configured with) the identity of the reference cell. In an example, the reference cell can be the serving cell. In any case, for example, beam set determining component 254 can use the synchronization information to determine the SSB occasions of the target cell.

For example, if synchronization between cells is assumed, then all cells within a frequency are in full synchronization (i.e. SSB occasions are also in synchronization). In this example, handover component 342 may not indicate an offset between SMTC windows of neighbor cells. For synchronized cells, beam set determining component 254 can determine SSB index using serving cell timing without decoding neighbor cell PBCH. NR-U may not allow all cells to be in full synchronization, however (i.e. same time occasion for an SSB index for neighbor and serving cell). As described herein, however, if the UE can determine the repeat parameter, the beam set determining component 254 can determine the repeated beam index of one or more of the SSBs without decoding PBCH. For example, the network (e.g., via serving cell, target cell, or other cell) can indicate a list of cells that are synchronized and time offset of SMTC start point or a reference SSB occasion with respect to a reference cell or other reference time that can be determined by the UE 104. In one example, the reference point can be SMTC window/frame time/SSB occasion of serving cell, SMTC window/frame time/SSB occasion of a neighbor cell, etc. The network can indicate one or more of the above mentioned information. In one example, handover component 342 can indicate a frame time difference between serving cell (or another reference cell) and neighbor cell along with SMTC occurrence/SSB occasion of the given neighbor cell. In another example, network may directly indicate the time difference between SMTC occasions or SSB occasions between serving cell and a neighbor cell. Beam set determining component 254 can use this information to determine SSB occasion timing of the target cell (e.g., based on the offset and the known SSB occasions of the reference point). Thus, beam set determining component 254 can determine the beam set of SSBs based on the known SSB occasions and the repeat parameter (e.g., as SSB index modulo repeat parameter, as described).

In an example that may relate to whether synchronization information is transmitted/received, the indication of the repeat parameter may include an indication of whether the repeat parameter is restricted to being in a set of one or more values. For example, in receiving the indication of the repeat parameter at Block 406, beam set determining component 254, e.g., in conjunction with processor(s) 212, memory 216, transceiver 202, communicating component 242, etc., can receive an indication of whether the repeat parameter is restricted to a set of one or more values or whether the repeat parameter can be set to other values (e.g., substantially any configured value). In one example, beam set determining component 254 may receive this indication in measurement configuration from serving cell. For example, beam set determining component 254 can decode the measurement configuration to determine whether the repeat parameter can take any value without any restriction. In this example, in transmitting the indication of the repeat parameter at Block 502, handover component 342 can transmit the indication of whether the repeat parameter is restricted to a set of one or more values or can take other values.

Based on receiving this indication, for example, beam set determining component 254 can determine whether repeat parameter of the cells to be measured can use only restricted values (e.g., a factor of number of available PBCH DM-RS sequences, such as 1, 2, 4, 8, etc.) or can use any valid value of repeat parameter (e.g., 1, 2, 3, 4, 5, 6, . . . ). In one example, beam set determining component 254 can additionally or alternatively determine whether the repeat parameter is restricted to a set of one or more values or can use other values based on whether a measured cell is in sync with a reference cell or not (e.g., based on the synchronization information received at Block 412). In one aspect, if the measured cell is in sync with the serving cell or another reference cell (e.g., the identity of which or indication that it is a synchronized cell can be indicated within measurement configuration received at Block 412), then beam set determining component 254 can determine that the measured cell can have any valid value of repeat parameter (e.g. 1, 2, 3, 4, 5, 6 . . . ), or at least one or more other values outside of a set of restricted values, and beam set determining component 254 can determine the repeating beam index either by decoding PBCH of the measured cell or based on timing of SSB detection and PBCH DM-RS sequence decoded of measured cell as indicated in further aspects. In another aspect, if the measured cell is not in sync with serving cell or another reference cell (e.g., the identity of which or indication that it is not a synchronized cell can be indicated within measurement configuration received at Block 412), then the beam set determining component 254 can determine that the measured cell can have repeat parameter value within the restricted set (e.g., a factor of number of available PBCH DM-RS sequences, such as 1, 2, 4, 8, etc.) and beam set determining component can decode the PBCH DM-RS sequence of the measured cell to determine the repeating beam index. In one example, the restricted set of values may be indicated with the indication of the repeat parameter and/or in other configuration signaling, such as a measurement configuration, etc. The indication of the restricted set of values may be explicit and/or implicit (e.g., based on using an index as the indication and mapping the index to the corresponding restricted set of values), etc.

In another example, the network can indicate whether cells are in full synchronization (e.g., synchronization within a threshold time duration, such as a half slot) or approximate synchronization (synchronization with an error margin that is greater than the threshold time duration). For example, full sync can be used when cells are synced using a common timing source (e.g., global positioning system (GPS), while approximate sync can be more applicable for the case when gNB receives time difference between serving and neighbor cells (e.g. based on UE reports). For full sync, the beam set determining component 254 can determine SSB index of a neighbor cell based on time instance of PSS/SSS detection, and time offset between SMTC start/reference SSB occasion of the cell with respect to reference point, as described. For approximate sync, beam set determining component 254 can determine the SSB index of a neighbor cell based on time instance of PSS/SSS detection, time offset between SMTC start/reference SSB occasion of the cell with respect to reference point, and a decoded DM-RS sequence. In this example, the PSS/SSS and time offset can facilitate obtaining an approximate idea of range of SSB index corresponding to SSB received by beam set determining component 254, and the DM-RS sequence can provide finer granularity information about exact SSB index within the determined SSB index range.

In yet another example, in method 400, optionally at Block 416, a broadcast channel of one or more cells having at least a threshold signal strength can be decoded. In an aspect, beam set determining component 254, e.g., in conjunction with processor(s) 212, memory 216, transceiver 202, communicating component 242, etc., can decode the broadcast channel of one or more cells having at least a threshold signal strength. For example, beam set determining component 254 can determine the signal strength of each beam, and only decode those having the signal strength that achieves the threshold. In this regard beam set determining component 254 can avoid decoding PBCH of all SSBs. In this example, beam set determining component 254 can determine the repeating beam index from the PBCH (e.g., as SSB index modulo repeat parameter). For example, the threshold check can be performed over cell signal strength or individual SSB signal strength. In addition, in an example, the threshold value can be configured by the serving cell.

Where the repeat parameter is determinable by the UE, the UE can perform measurement filtering and reporting by determining associated SSBs based on the repeat parameter, as described. For example, as described, for NR-U, UE may receive multiple SSBs corresponding to same beam within an SMTC window, where the SSBs are repeated in an SSB burst. Where the repeat parameter is not determinable, the UE can include additional information in the reporting to allow possible association of SSBs.

In method 400, at Block 418, a beam set of the one or more of the multiple SSBs determined to have the same repeating beam index can be associated. In an aspect, beam set determining component 254, e.g., in conjunction with processor(s) 212, memory 216, transceiver 202, communicating component 242, etc., can associate the beam set of the one or more of the multiple SSBs determined to have the same repeating beam index. For example, where the repeat parameter can be determined, beam set determining component 254 can associate a set of multiple SSBs that have the same repeating beam index, as determined based on the repeat parameter. Where the repeat parameter cannot be determined, beam set determining component 254 can associate the beam set as being a single beam (e.g., different transmitted instances of the same beam), in one example, or in other examples can associate multiple beams in a set based on a hypothesis for the repeat parameter, as described further herein.

In any case, in method 400, at Block 420, one or more parameters of the one or more of the multiple SSBs of the beam set can be measured. In an aspect, measurement component 256, e.g., in conjunction with processor(s) 212, memory 216, transceiver 202, communicating component 242, etc., can measure the one or more parameters of the one or more of the multiple SSBs of the beam set. For example, measurement component 256 can measure a signal strength of the one or more SSBs in the beam set, such as a received signal strength indicator (RSSI), reference signal received power (RSRP), reference signal received quality (RSRQ), signal-to-noise ratio (SNR), etc. For example, measurement component 256 can measure each SSB in the beam set for all of one or more beam sets determined for the multiple SSBs.

In method 400, at Block 422, a measurement of the one or more parameters of the beam set for the target cell can be reported to a serving cell. In an aspect, measurement component 256, e.g., in conjunction with processor(s) 212, memory 216, transceiver 202, communicating component 242, etc., can report, to the serving cell, the measurement of the one or more parameters of the beam set for the target cell. For example, where there are multiple SSBs in a given beam set, measurement component 256 can report the measurement as a function of the measurements of the multiple SSBs in the set, such as an average measurement, a maximum measurement, a randomly selected measurement, all of the measurements, etc.

In an example, where the repeat parameter is known, the UE 104 may essentially receive multiple SSBs corresponding to same beam within an SMTC window (e.g., each beam with the same repeating beam index determined based on the SSB index and repeat parameter, as described). In this example, measurement component 256 can perform filtering and reporting of the multiple beams. Additionally, in an example, in reporting the measurement at Block 422, optionally at Block 424, measurements of two or more SSBs having a signal strength that achieves a threshold can be filtered. In an aspect, measurement component 256, e.g., in conjunction with processor(s) 212, memory 216, transceiver 202, communicating component 242, etc., can filter measurements of the two or more SSBs having the signal strength that achieves the threshold. In this example, reporting the measurements as described herein may be limited to considering, for each beam set, the SSBs that have the signal strength that achieve the threshold.

Figure 8:
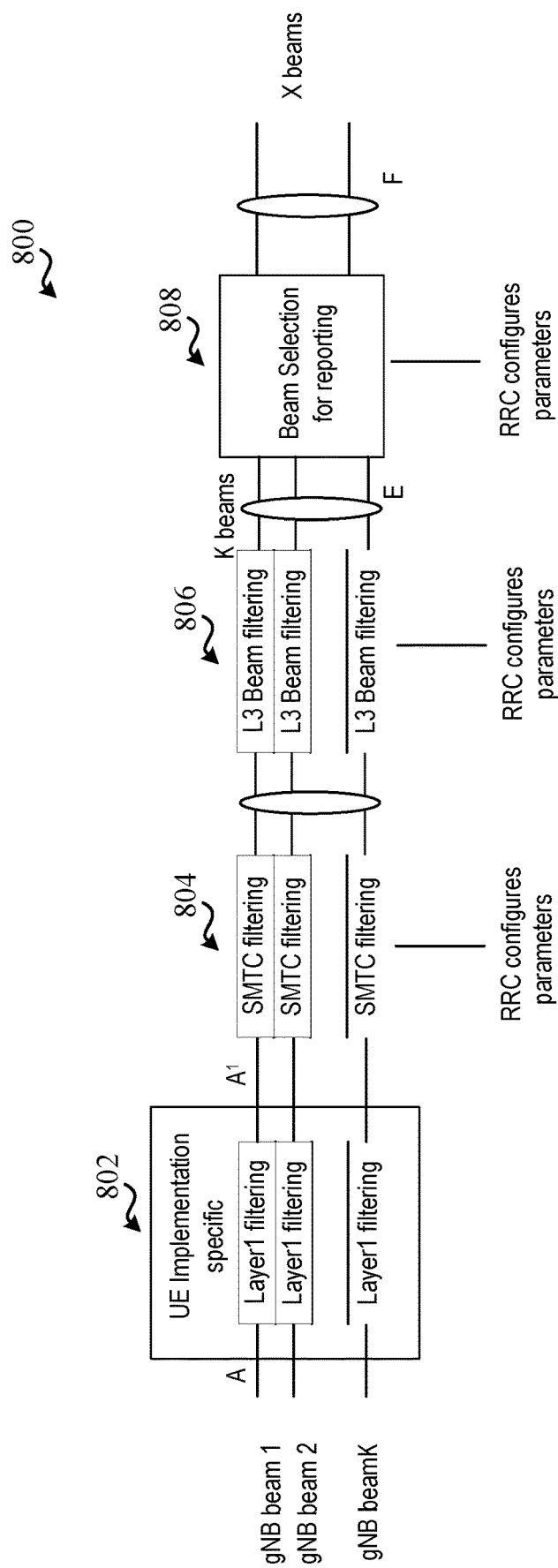
FIG. 8 illustrates an example of filtering SSB measurements, in accordance with various aspects of the present disclosure.

FIG. 8 depicts an example of a filtering operation 800 for filtering measurements received for multiple SSBs corresponding to the same beam (e.g., the same beam as beamformed using the same beamforming matrix). For example, in reporting the measurement of the one or more parameters, measurement component 256 can optionally perform UE-implementation specific layer 1 (e.g., PHY layer) filtering to one or more beams at 802. In addition, for example, measurement component 256 can filter multiple measurement SSB samples corresponding to the same repeating beam index within an SMTC window (SMTC filtering indicated at 804). For example, measurement component 256 can consider a SSB sample for filtering only if detected signal strength is greater than a threshold. The threshold value can be fixed or can be based on highest signal strength for an SSB with same beam index (e.g. threshold=Max Signal Strength—Offset), etc. The number of SSB samples can be further restricted by number of SSBs which are transmitted within an SS burst (which can be indicated or otherwise configured by the network). For example measurement component 256 can report the measurement using one or more of the following processes. In one example, measurement component 256 can perform averaging over the SSB samples to generate the measurement for reporting (e.g., averaging can be linear average or any other type of averaging (e.g. infinite impulse response (IIR) filtering)). In another example, measurement component 256 can perform a filtering operation to select the SSB sample which has the maximum signal strength (e.g. RSRP/RSRQ/RSSI/SINR) among the samples with same beam. In another example, measurement component 256 can perform random selection of SSB sample among the samples with the same beam index. In another example, measurement component 256 can perform a filtering operation to select the SSB sample which was last received by UE. In another example, measurement component 256 can perform a filtering operation to select the SSB sample which was first received by UE.

In yet another example, measurement component 256 may not perform filtering e.g., all SSB measurement samples can be passed to layer 3 (L3), or radio resource control (RRC) layer, filtering at Block 806). The above operations can be performed in the physical layer (e.g., PHY or Layer 1 (L1)) where for each SMTC window, physical layer forwards signal strength of SSB sample(s) along with beam index to upper layers for further processing, RRC layer assuming that physical layer forwards each SSB measurement sample to RRC layer for filtering (e.g., where for each beam index, RRC performs L3 filtering of SSB samples of this SMTC window and previous SMTC windows). For beam reporting, the measurement component 256 can report the beam index (e.g., the repeating beam index) along with filtered result at 808.

Figure 9:
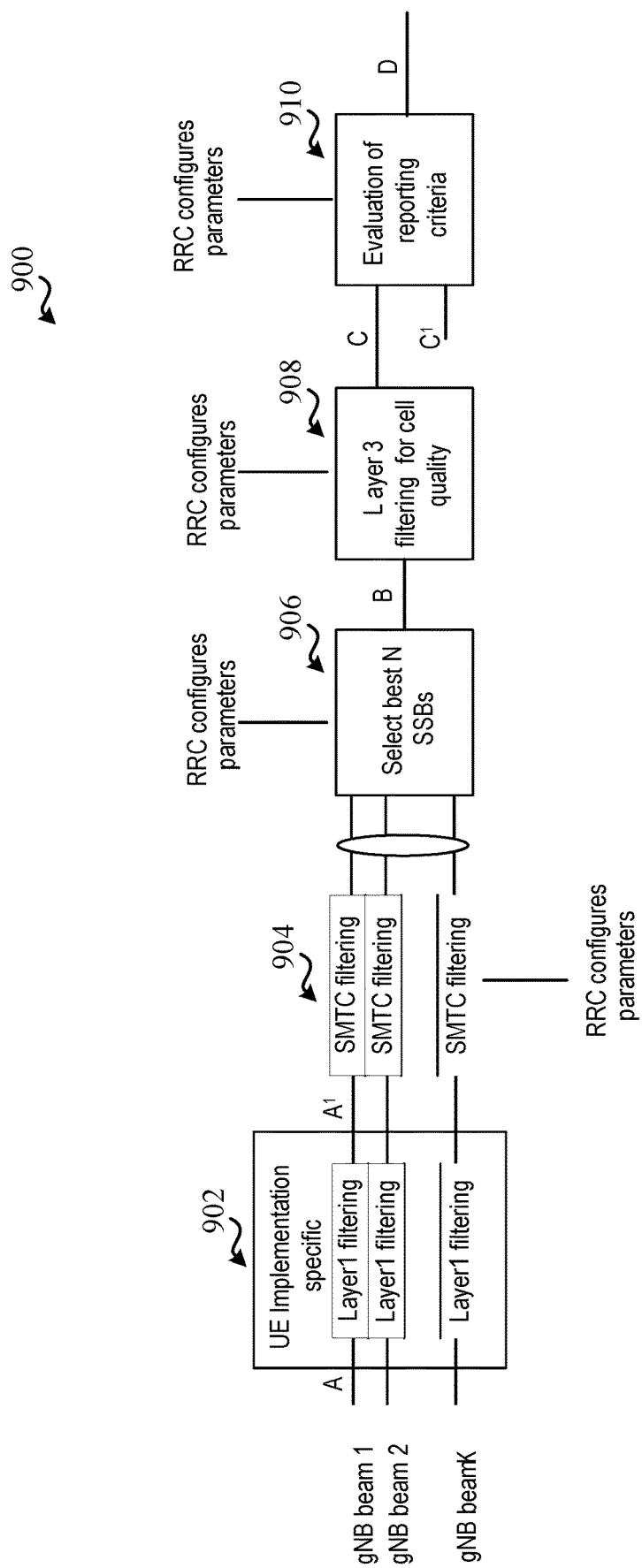
FIG. 9 illustrates an example of evaluating cell quality, in accordance with various aspects of the present disclosure.

In another example, measurement component 256 can report a cell quality by reporting an average signal strength of SSBs associated with a number of different repeating beam indices. For example, measurement component 256 can report the average signal strength of beams having a signal strength that achieves a threshold regardless of beam index. An example is shown in FIG. 9, which depicts a selection operation 900 to filter two or more SSBs associated with same beam index, select the number of beams, layer 3 filtering for the selection, and evaluation of reporting criteria for reporting cell quality. Additionally, in an example, measurements of two or more SSBs having a signal strength that achieves a threshold can be filtered. In an aspect, measurement component 256, e.g., in conjunction with processor(s) 212, memory 216, transceiver 202, communicating component 242, etc., can optionally perform UE-implementation specific layer 1 (e.g., PHY layer) filtering to one or more beams at 902. In addition, for example, measurement component 256 can filter multiple measurement SSB samples corresponding to the same repeating beam index within an SMTC window (SMTC filtering indicated at 904). Moreover, measurement component 256 can filter measurements of the two or more SSBs having the signal strength that achieves the threshold at 906 (e.g., based on RRC-configured parameters, which may include the thresholds). Measurement component 256 can additionally filter the measurements for cell quality at 908 (e.g., pass measurements that achieve a cell quality threshold for evaluation), which may be based on RRC-configured parameters. Measurement component 256 cam evaluate the measurements for reporting criteria at 910, and can report one or more measurements that satisfy the criteria (which may also be based on RRC-configured parameters). In this example, evaluating cell quality as described herein may be limited to considering, for each beam set, the SSBs that have the signal strength that achieve the threshold.

FIG. 9 depicts an example of a filtering operation 900 for filtering measurements received for multiple SSBs corresponding to the same beam (e.g., the same beam as beamformed using the same beamforming matrix). For example, in evaluating cell quality, measurement component 256 can optionally perform UE-implementation specific layer 1 (e.g., PHY layer) filtering to one or more beams at 902. In addition, for example, measurement component 256 can filter multiple measurement SSB samples corresponding to the same repeating beam index within an SMTC window (SMTC filtering indicated at 904). For example, measurement component 256 can consider a SSB sample for filtering only if detected signal strength is greater than a threshold at 906. The threshold value can be fixed or can be based on highest signal strength for an SSB with same beam index (e.g. threshold=Max Signal Strength—Offset), etc. The number of SSB samples can be further restricted by number of SSBs which are transmitted within an SS burst (which can be indicated or otherwise configured by the network). For example measurement component 256 can report the measurement using one or more of the following processes. In one example, measurement component 256 can perform averaging over the SSB samples to generate the measurement for reporting (e.g., averaging can be linear average or any other type of averaging (e.g. infinite impulse response (IIR) filtering)). In another example, measurement component 256 can perform a filtering operation to select the SSB sample which has the maximum signal strength (e.g. RSRP/

RSRQ/RSSI/SINR) among the samples with same beam. In another example, measurement component 256 can perform random selection of SSB sample among the samples with the same beam index. In another example, measurement component 256 can perform a filtering operation to select the SSB sample which was last received by UE. In another example, measurement component 256 can perform a filtering operation to select the SSB sample which was first received by UE. In yet another example, measurement component 256 may not perform filtering e.g., all SSB measurement samples can be passed to layer 3 (L3), or radio resource control (RRC) layer, filtering at 908). The above operations can be performed in the physical layer (e.g., PHY or Layer 1 (L1)) where for each SMTC window, physical layer forwards signal strength of SSB sample(s) along with beam index to upper layers for further processing, RRC layer assuming that physical layer forwards each SSB measurement sample to RRC layer for filtering (e.g., where for each beam index, RRC performs L3 filtering of SSB samples of this SMTC window and previous SMTC windows). For evaluating cell quality, the measurement component 256 can process the beam index (e.g., the repeating beam index) along with filtered result for beam selection and Layer-3 filtering.

In addition, in method 500, at Block 510, a reporting of a measurement of one or more parameters of a beam set of a target cell can be received. In an aspect, handover component 342, e.g., in conjunction with processor(s) 312, memory 316, transceiver 302, etc., can receive the reporting of the measurement of one or more parameters of the beam set of the target cell. For example, handover component 342 may receive measurements for multiple beam sets, a cell quality measurement (e.g., average of beams for the beam sets), and/or the like.

In method 500, at Block 512, the measurement can be processed, based at least in part on whether a repeat parameter is determinable, for determining whether to handover the UE to the target cell. In an aspect, report processing component 352, e.g., in conjunction with processor(s) 312, memory 316, transceiver 302, handover component 342, etc., can process the measurement, based at least in part on whether a repeat parameter is determinable, for determining whether to handover the UE 104 to the target cell. For example, where the repeat parameter is determinable, this may indicate that the UE 104 reported measurements of multiple beams having the same repeating beam index, and report processing component 352 can process the measurement of each beam set as relating to a specific repeating beam index (which may be indicated in the report with the measurement, as described), where the measurement is an average measurement of SSBs in the beam set (or an average of SSBs in the beam set that achieve a threshold signal strength), a maximum measurement of the SSBs in the beam set, a measurement of a randomly selected SSB in the beam set (or of SSBs in the beam set that achieve a threshold signal strength), measurements of all SSBs in the beam set (or of beams in the beam set that achieve a threshold signal strength), etc. For example, handover component 342 can determine to handover the UE 104, and/or determine a beam for the UE 104 and/or target cell to use(, where the measurements achieve one or more handover thresholds. In an example, handover component 342 can indicate the beam to the UE 104 and/or target cell.

Where the repeat parameter is not determinable by the UE 104, for example, other considerations may apply in reporting SSB measurements. For example, performing measurement filtering and reporting results may benefit from beam index identification, as described above. Beam index may be required to allocate contention free RACH resource in target cell and/or for determining cell quality. However, where the value of Q is not known for a measured cell and/or where beam index computation may otherwise require PBCH decoding, and UE has not acquired PBCH, the repeating beam index may not be determinable. In examples described herein, different operations can be performed to account for the repeating bam index not being determinable. Various examples described herein relate to operations in physical layer and/or RRC layer; however, each of the given operations can be performed in any layer. In addition, in certain examples, the network can configure beam based measurement report triggers, such as beam based report trigger that can be implicitly activated for cells for which beam index cannot be derived by UE, explicitly configured beam based report trigger by serving cell for a list of cells or frequency or measurement object, etc. For example, the triggers can be beam signal strength of target cell becomes better/worse than a threshold, beam signal strength of target cell becomes better/worse than a threshold and cell quality of serving cell becomes better/worse than a threshold, beam signal strength of serving cell becomes better/worse than a threshold and beam signal strength of target cell becomes better/worse than a threshold, etc. If value of Q is known then beam_index=SSB_index modulo Q. In addition, beam signal strength can imply average of signal strength of best N SSBs (where N is pre-defined or provided by serving cell).

In this example, in method 500, optionally at Block 514, an indication of one or more reporting triggers can be transmitted. In an aspect, handover component 342, e.g., in conjunction with processor(s) 312, memory 316, transceiver 302, etc., can transmit (e.g., to one or more UEs via RRC signaling, dedicated control signaling, etc.) the indication of the one or more reporting triggers (e.g., in a measurement configuration or other transmission). Similarly, in method 400, optionally at Block 426, a configuration indicating one or more reporting triggers can be received. In an aspect, SSB measuring component 252, e.g., in conjunction with processor(s) 212, memory 216, transceiver 202, communicating component 242, etc., can receive (e.g., from a base station via RRC signaling, dedicated control signaling, etc.) the configuration indicating the one or more reporting triggers (e.g., in a measurement configuration or other transmission). For example, identifying the repeating beam index may be based on the received configuration. Where the repeat parameter is not determinable, identifying the repeating beam index may include identifying an index for a given SSB, which may not be considered as repeating in the measurement time window as the beam set determining component 254 may not associate a beam set within the measurement time window since the repeat parameter is not known. For example, beam set determining component 254 may determine the index as a sequential index of the SSB beam within the SMTC window.

In this example, in method 400, optionally at Block 428, occurrence of a reporting trigger can be detected. In an aspect, SSB measuring component 252, e.g., in conjunction with processor(s) 212, memory 216, transceiver 202, communicating component 242, etc., can detect occurrence of the reporting trigger, which can be based on the configuration received at Block 426, as described. For example, SSB measuring component 252 may detect one or more of beam signal strength of target cell becomes better/worse than a threshold, beam signal strength of target cell becomes better/worse than a threshold and cell quality of serving cell becomes better/worse than a threshold, beam signal strength of serving cell becomes better/worse than a threshold and beam signal strength of target cell becomes better/worse than a threshold, etc. In this example, beam set determining component 254 my associate the beam in its own set, in one example, and measurement component 256 can report measurement of the beam (e.g., along with other beams in the measurement time window or otherwise). In one example, in NR, if beam measurement reporting is configured, then UE 104 can report beam measurements along with cell measurement. In this example, where the repeat parameter (and thus repeating beam index) is not determinable, measurement component 256 may report cell measurements (e.g., beam measurements are excluded). For example, beam set determining component 254 can, at the physical layer, assume each SSB measurement within a measurement time window corresponds to a different beam. For each measurement time window, measurement component 256, at the physical layer, can forward each SSB signal strength to upper layers for further processing. Once SSB results are obtained from physical layer for a measurement time window, measurement component 256, at the RRC layer, can determine cell quality by averaging at most N SSB measurements which are greater than a threshold, where N is a positive integer. The determined value can then be averaged (e.g., using linear averaging or exponential averaging) over previous measurement time windows (e.g., SMTC windows). Measurement component 256, in this example, can report only cell measurements (e.g., beam based results are not included) irrespective of reporting configuration, and report processing component 352 can process the measurements as such.

In another example, in reporting the measurement at Block 422, optionally at Block 430, a measurement of the one or more parameters of the beam set and/or of one or more other SSBs in another measurement time window can be reported. In an aspect, measurement component 256, e.g., in conjunction with processor(s) 212, memory 216, transceiver 202, communicating component 242, etc., can report the measurement of the one or more parameters of the beam set and/or of one or more other SSBs in another measurement time window. In this example, measurement component 256 can report the best (e.g., highest) SSB measurement within a measurement time (e.g., SMTC) window if beam index cannot be determined. For example, measurement component 256, at the physical layer, can assume each SSB measurement within a SMTC corresponds to a different beam. For each SMTC window, measurement component 256, at the physical layer, can forward each SSB signal strength to upper layers for further processing/reporting. Measurement component 256, at the RRC layer, can select the best beam (e.g., SSB with highest signal strength), and can perform averaging signal strength of best beam over different SMTC windows, where input to the filter is highest signal strength observed for a SSB within an SMTC (irrespective of whether SSB index is same or different across SMTC). Averaging can be linear averaging or exponential averaging over previous SMTC windows. Measurement component 256 can report only best beam measurement without indicating beam index.

In this example, in processing the measurement at Block 512, optionally at Block 516, a measurement of the one or more parameters of the beam set and/or of one or more other SSBs in another measurement time window can be received. In an aspect, report processing component 352, e.g., in conjunction with processor(s) 312, memory 316, transceiver 302, handover component 342, etc., can receive (e.g., from the UE 104) the measurement of the one or more parameters of the beam set and/or of one or more other SSBs in another measurement time window. Handover component 342 can use this measurement, which may be more indicative of a cell measurement, in determining whether to handover the UE 104 to the target cell (e.g., where the measurement achieves one or more thresholds).

In another example of reporting beam measurements without beam index if repeating beam index cannot be determined, measurement component 256, at the RRC layer, may not perform any averaging of quality of individual SSBs over multiple SMTC windows (i.e. beam report contains signal strength of beam for the latest SMTC window only), and the measurement component 256 can report the signal strength of N best SSBs without reporting beam indices. In this example, handover component 342 can use this measurement in determining whether to handover the UE 104 to the target cell (e.g., where the measurement achieves one or more thresholds).

In another example of reporting beam measurements without beam index if repeating beam index cannot be determined, measurement component 256 can report time instance of SSB reception, which may allow the serving cell receiving the reported measurements to determine the repeating beam index or association thereof for received measurements. In this example, in reporting the measurement at Block 422, optionally at Block 432, a DM-RS sequence and/or time offset value related to the beam set can be reported. In an aspect, measurement component 256, e.g., in conjunction with processor(s) 212, memory 216, transceiver 202, communicating component 242, etc., can report the DM-RS sequence and/or the time offset value related to the beam set (e.g., along with the corresponding measurement).

For example, measurement component 256, at the physical layer, can assume each SSB measurement within a SMTC corresponds to a different beam, and may keep track of time offset of SSB detection with respect to a reference point. The reference point may be configured by the network (e.g., in the configuration of reporting triggers). For example, the reference point can be SMTC window of serving cell, SMTC window of a neighbor cell, SMTC window of another reference cell, and/or the like. In this example, the time offset can perform a similar function as PBCH payload indicating DM-RS cycle number. For each SMTC window, measurement component 256, at the physical layer, can forward each SSB signal strength (along with time offset of SSB and DM-RS detected) to upper layers for further processing. Measurement component 256, at the RRC layer, can for each combination of DM-RS and time offset value, perform averaging (e.g., linear averaging or exponential averaging) over previous SMTC windows. Measurement component 256 can report the averaged measurement along with the DM-RS sequence and/or time offset for each beam measurement.

In this example, in processing the measurement at Block 512, optionally at Block 518, a DM-RS sequence and/or time offset value related to the beam set can be received and/or transmitted. In an aspect, report processing component 352, e.g., in conjunction with processor(s) 312, memory 316, transceiver 302, handover component 342, etc., can receive and/or transmit the DM-RS sequence and/or time offset value related to the beam set. For example, report processing component 352 can decode the SSB index and thus beam index (using value of Q) based on DM-RS sequence and time offset known to be associated with the SSB index. Report processing component 352 can accordingly associate the measurements with the repeating beam index, and process the measurement as described above to determine whether to handover the UE 104. In another example, report processing component 352 can transmit the DM-RS and/or time offset value to the target cell and let the target cell accordingly determine the measurements (and/or forward the measurements and/or associated beam indices to the serving cell for handover consideration).

In another example of reporting beam measurements without beam index if repeating beam index cannot be determined, measurement component 256 can assume that each DM-RS sequence corresponds to a different beam, e.g., beam index=DM-RS sequence, and can associate beams in a beam set based on DM-RS. In this example, measurement component 256 report measurements in the beam set as described above (e.g., as an average measurement of the SSBs or SSBs achieving a threshold signal strength, a maximum measurement of the SSBs, a randomly selected measurement of the SSBs or SSBs achieving a threshold signal strength, all measurements of the SSBs or SSBs achieving a threshold signal strength, a last measurement of the SSBs or SSBs achieving a threshold signal strength, a first measurement of the SSBs or SSBs achieving a threshold signal strength, etc.). In this example, measurement component 256 can also indicate, within the report, that beam index considered is DM-RS sequence. As described above, report processing component 352 can at least one of decode the SSB index and thus beam index (using value of Q) based on DM-RS sequence, or forward the DM-RS sequence to target cell and let the target cell accordingly determine the measurements.

In another example of reporting beam measurements without beam index if repeating beam index cannot be determined, measurement component 256 can hypothesize the repeat parameter, as described above. In this example, measurement component 256 can perform beam measurements and reporting for different possible Q values. In this example, in reporting the measurement at Block 422, optionally at Block 434, a first measurement of the one or more parameters of the beam set based on a first hypothesis for the repeat parameter and a second measurement of the one or more parameters of the beam set based on a second hypothesis for the repeat parameter can be reported. In an aspect, measurement component 256, e.g., in conjunction with processor(s) 212, memory 216, transceiver 202, communicating component 242, etc., can report the first measurement of the one or more parameters of the beam set based on the first hypothesis for the repeat parameter and the second measurement of the one or more parameters of the beam set based on a second hypothesis for the repeat parameter (and/or other measurements based on other hypotheses for the repeat parameter).

For example, measurement component 256 can assume different candidate Q values (candidate Q values can be provided by network or UE can assume every possible Q value). For each candidate Q value, measurement component 256 can perform filtering operation to determine a measurement for the beam set (e.g., as an average measurement of the SSBs or SSBs achieving a threshold signal strength, a maximum measurement of the SSBs, a randomly selected measurement of the SSBs or SSBs achieving a threshold signal strength, all measurements of the SSBs or SSBs achieving a threshold signal strength, a last measurement of the SSBs or SSBs achieving a threshold signal strength, a first measurement of the SSBs or SSBs achieving a threshold signal strength, etc.). Measurement component 256 can then report the beam measurements along with assumed Q values to serving cell.

In this example, in processing the measurement at Block 512, optionally at Block 520, a first measurement of the one or more parameters of the beam set based on a first hypothesis for the repeat parameter and a second measurement of the one or more parameters of the beam set based on a second hypothesis for the repeat parameter can be received and/or transmitted. In an aspect, report processing component 352, e.g., in conjunction with processor(s) 312, memory 316, transceiver 302, handover component 342, etc., can receive and/or transmit the first measurement of the one or more parameters of the beam set based on the first hypothesis for the repeat parameter and the second measurement of the one or more parameters of the beam set based on a second hypothesis for the repeat parameter (and/or other measurements based on other hypotheses for the repeat parameter). In this example, report processing component 352 can select the correct measurement (using value of Q of target cell) for further processing (e.g., to determine whether to handover UE 104). In another example, report processing component 352 can forward the reported measurements along with Q values to target cell and let the target cell accordingly select the measurements.

In addition, in an example, in NR, the UE may not perform measurements outside SMTC provided for a frequency. For asynchronous cell deployments, however, all neighbor cells may not follow the same SMTC configuration. In this example, serving cell may not know the SMTC configuration of neighbor cells in NR-U (e.g. due to timing drift of a cell). Thus, in an example, the network may configure UE to measure cells outside configured SMTC. In this example, in method 500, optionally at Block 522, an indication to measure outside of the measurement time window (SMTC), an additional measurement time window, or a listing of cells to measure can be transmitted. In an aspect, handover component 342, e.g., in conjunction with processor(s) 312, memory 316, transceiver 302, etc., can transmit (e.g., to one or more UEs via RRC signaling, dedicated control signaling, etc.) the indication to measure outside of the measurement time window (e.g., the window configured for the serving cell), an additional measurement time window (e.g., specifically for one or more target cells), or a listing of cells to measure. For the additional measurement time window, for example, the network may configure (e.g., via handover component 342) measurement window (which can be continuously occurring periodic time window or periodic time window with limited number of periodic cycles or single instance of window in time) where UE can perform SSB measurements outside the SMTC window, and the measurement window may or may not have any parameter common to SMTC window of the measured frequency.

In an example, serving cell may indicate (e.g., via handover component 342) to UE to perform measurements of neighbor cells within the periods when Discontinuous Reception (DRX) state is off. In another aspect, if additional measurement window is not indicated and if SMTC is not indicated, measurement component 256 can perform measurements any time (that is without any time restrictions for measuring frequencies which does not require measurement gap) or any time during measurement gaps (for measuring frequencies which require a measurement gap) to identify neighbor cells. In another aspect, serving cell may configure UE to performs measurements in RRC idle state by providing an indication to measure outside of the measurement time window (SMTC), an additional measurement time window, or a listing of cells to measure, and may configure UE to report the measurement results at the next instance when UE switches to RRC connected state.

In this example, in identifying the repeating beam index at Block 404, optionally at Block 436, an indication to measure outside of the measurement time window (SMTC), an additional measurement time window, or a listing of cells to measure can be received. In an aspect, beam set determining component 254, e.g., in conjunction with processor(s) 212, memory 216, transceiver 202, communicating component 242, etc., can receive the indication to measure outside of the measurement time window (SMTC), the additional measurement time window, or the listing of cells to measure. Beam set determining component 254 can accordingly identify the repeating beam index, as described above, but based on beams measured outside of the measurement time window (SMTC), in the additional measurement time window, and/or of one or more of the listing of cells. Further, serving cell may configure UE to report measurements parameters related to the neighbor cells detected by UE which may include one or more of Physical Cell Identity, SMTC window start time instance with respect to serving cell timing, duration of an SMTC window, number of SSBs transmitted within an SS burst.

In yet another example of measuring beams outside of the measurement time window for the serving cell, a one shot/semi-persistent long measurement gap can be provided by serving cell (e.g., in RRC configuration, dedicated signaling, or other configuration). For example, the configuration can include a gap duration, gap periodicity and gap offset with respect to a fixed frame timing, an activation mechanism (e.g., L1 command or RRC or MAC CE), a deactivation mechanism, and/or the like. For example, a deactivation mechanism may include an autonomous deactivation where after activation, the measurement gap pattern repeats for N cycles, where N is a positive integer, after which N cycles, the gap is autonomously deactivated. In another example, the deactivation mechanism may include network sending explicit deactivation command (L1/RRC/MAC CE) to deactivate the gap.

Accordingly, in this example, in method 500, optionally at Block 524, an indication of a gap duration, periodicity, offset, activation, or deactivation for measuring at least the target cell can be transmitted. In an aspect, handover component 342, e.g., in conjunction with processor(s) 312, memory 316, transceiver 302, etc., can transmit (e.g., to one or more UEs via RRC signaling, dedicated control signaling, etc.) the indication of the gap duration, periodicity, offset, activation, or deactivation for measuring at least the target cell. For example, handover component 342 can transmit this information in one or more configurations for the UE 104, as described. Similarly, in identifying the repeating beam index at Block 404, optionally at Block 438, an indication of a gap duration, periodicity, offset, activation, or deactivation for measuring at least the target cell can be received. In an aspect, beam set determining component 254, e.g., in conjunction with processor(s) 212, memory 216, transceiver 202, communicating component 242, etc., can receive (e.g., from a base station via RRC signaling, dedicated control signaling, etc.) the indication of the gap duration, periodicity, offset, activation, or deactivation for measuring at least the target cell. In this regard, in identifying the repeating beam index, beam set determining component 254 can consider measurements received during the gap, as based on the duration, periodicity, and/or offset parameters from a time determined based on the activation until the deactivation is determined.

Figure 6:
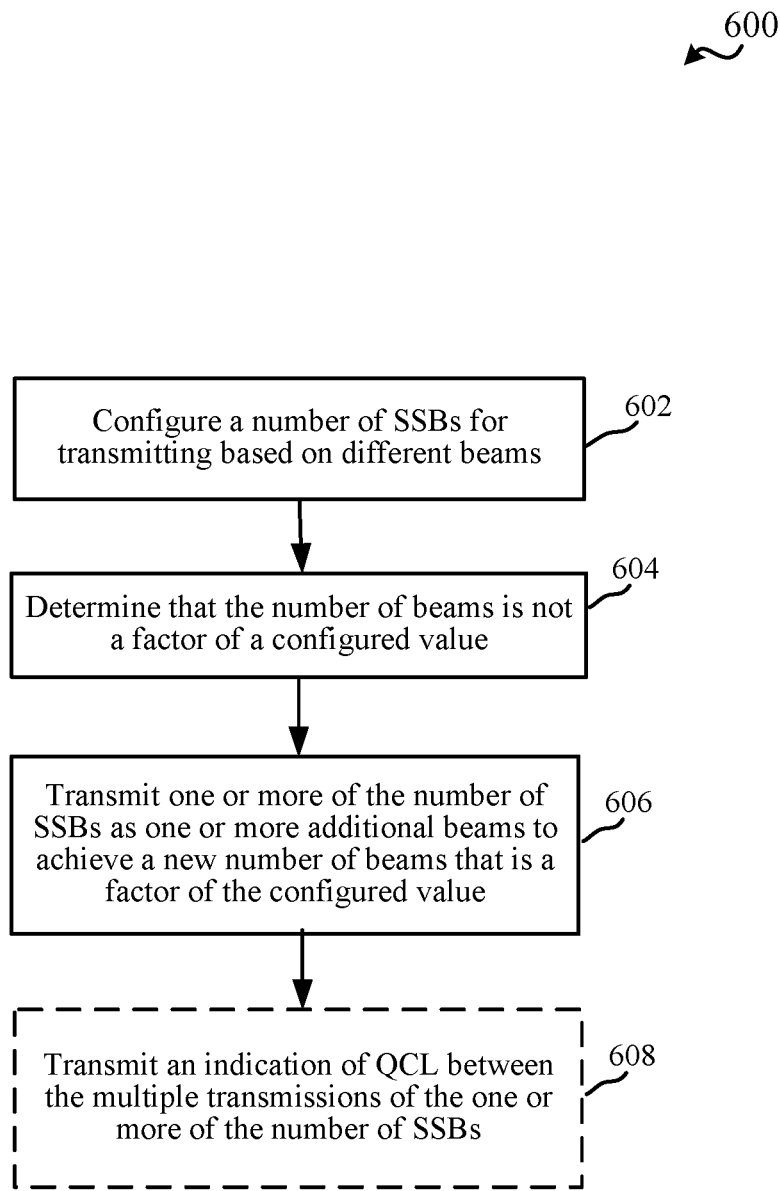
FIG. 6 is a flow chart illustrating an example of a method for transmitting SSBs, in accordance with various aspects of the present disclosure.

FIG. 6 illustrates a flow chart of an example of a method 600 for transmitting SSBs. In one example, base station 102 can perform the functions described in method 600 using one or more of the components described in FIGS. 1 and 3.

In method 600, at Block 602, a number of SSBs for transmitting based on different beams can be configured. In an aspect, handover component 342, e.g., in conjunction with processor(s) 312, memory 316, transceiver 302, etc., can configure the number of SSBs for transmitting based on different beams. For example, handover component 342 can transmit the SSBs for obtaining and measuring by a UE 104 to consider the base station 102 for handover. For example, handover component 342 can configure the SSBs for transmitting according to a pattern, such as that shown in FIG. 7.

In method 600, at Block 604, it can be determined that the number of beams is not a factor of a configured value. In an aspect, handover component 342, e.g., in conjunction with processor(s) 312, memory 316, transceiver 302, etc., can determine that the number of beams is not a factor of a configured value. In one example, handover component 342 can determine that the number of beams is not a factor of a number of DM-RS sequences related to transmitting the SSBs (e.g., 8).

In method 600, at Block 606, one or more of the number of SSBs can be transmitted as one or more additional beams to achieve a new number of beams that is a factor of the configured value. In an aspect, handover component 342, e.g., in conjunction with processor(s) 312, memory 316, transceiver 302, etc., can transmit the one or more of the number of beams as one or more additional beams to achieve the new number of beams that is a factor of the configured value. For example, handover component 342 can add transmissions of the one or more beams to achieve the factor of the number of DM-RS sequences (e.g., a configured value of 8 DM-RS sequences, to achieve a factor of 8 as 1, 2, 4, or 8 beams in the pattern). In this regard, the UE 104 can determine the repeating beam index based on determining similar properties of signals based on being a factor of the number of DM-RS sequences.

In method 600, optionally at Block 608, an indication of QCL between the multiple transmissions of the one or more of the number of SSBs can be transmitted. In an aspect, handover component 342, e.g., in conjunction with processor(s) 312, memory 316, transceiver 302, etc., can transmit the indication of the QCL between the multiple transmissions of the one or more of the number of SSBs within an instance of the transmission pattern. As described, the target cell can indicate this information, in this example, and/or the serving cell can additionally or alternatively indicate this information. For example, for three configured SSBs, where a factor of 8 is desired, handover component 342 can configure an extra SSB to achieve four SSBs, where the extra SSB is a repetition of one of the three configured SSBs. Handover component 342 can indicate the QCL relationship between the repeated SSB and the extra SSB. In either case, the UE 104 can determine the QCL property, and can use this information in reporting measurements for SSBs (e.g., by associating measurements of the QCL SSBs).

Figure 10:
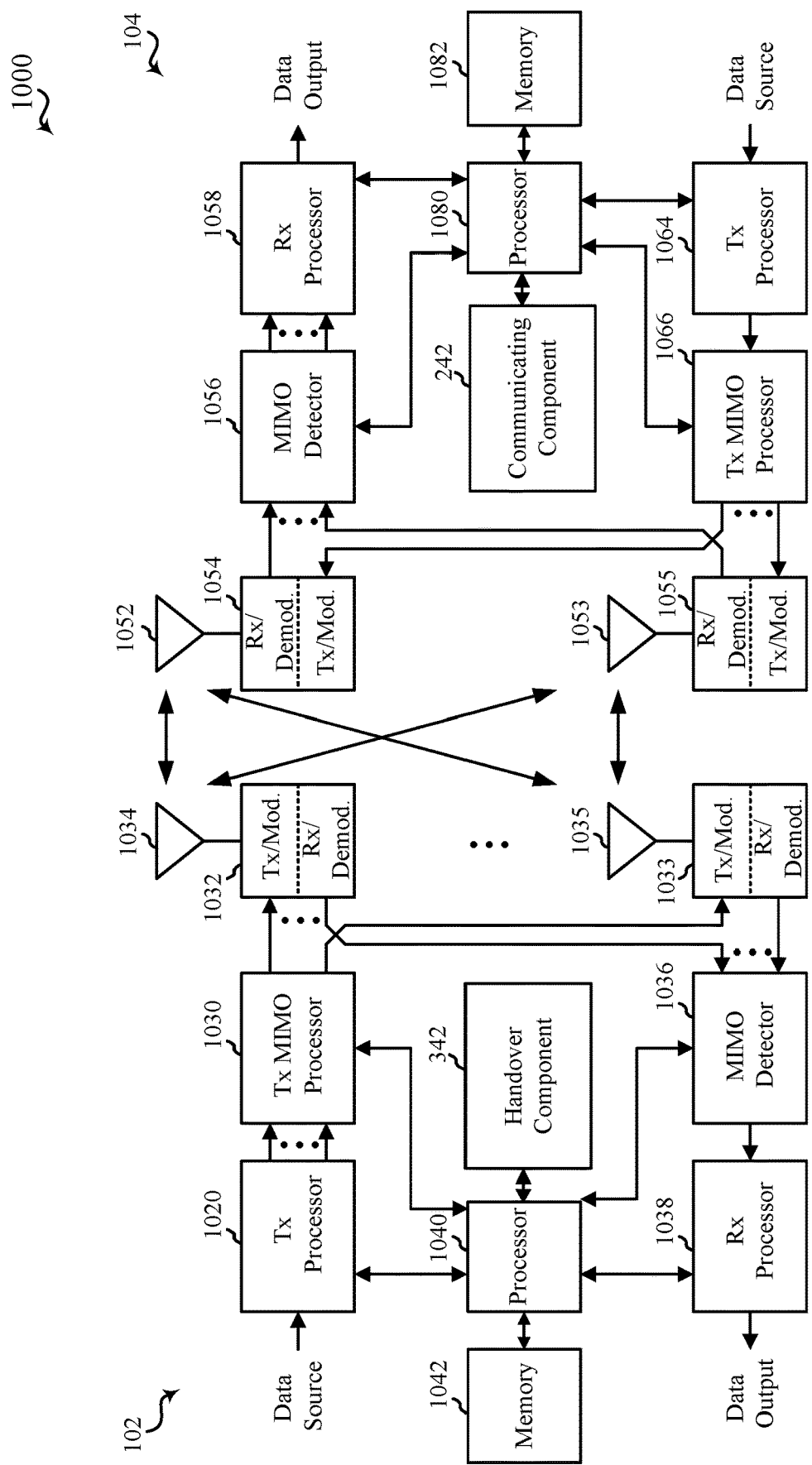
FIG. 10 is a block diagram illustrating an example of a MIMO communication system including a base station and a UE, in accordance with various aspects of the present disclosure.

FIG. 10 is a block diagram of a MIMO communication system 1000 including a base station 102 and a UE 104. The MIMO communication system 1000 may illustrate aspects of the wireless communication access network 100 described with reference to FIG. 1. The base station 102 may be an example of aspects of the base station 102 described with reference to FIG. 1. The base station 102 may be equipped with antennas 1034 and 1035, and the UE 104 may be equipped with antennas 1052 and 1053. In the MIMO communication system 1000, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1020 may receive data from a data source. The transmit processor 1020 may process the data. The transmit processor 1020 may also generate control symbols or reference symbols. A transmit MIMO processor 1030 may perform spatial processing (e.g., precoding) on data symbols, control symbols, or reference symbols, if applicable, and may provide output symbol streams to the transmit modulator/demodulators 1032 and 1033. Each modulator/demodulator 1032 through 1033 may process a respective output symbol stream (e.g., for OFDM, etc.) to obtain an output sample stream. Each modulator/demodulator 1032 through 1033 may further process (e.g., convert to analog, amplify, filter, and upconvert) the output sample stream to obtain a DL signal. In one example, DL signals from modulator/demodulators 1032 and 1033 may be transmitted via the antennas 1034 and 1035, respectively.

The UE 104 may be an example of aspects of the UEs 104 described with reference to FIGS. 1-2. At the UE 104, the UE antennas 1052 and 1053 may receive the DL signals from the base station 102 and may provide the received signals to the modulator/demodulators 1054 and 1055, respectively. Each modulator/demodulator 1054 through 1055 may condition (e.g., filter, amplify, downconvert, and digitize) a respective received signal to obtain input samples. Each modulator/demodulator 1054 through 1055 may further process the input samples (e.g., for OFDM, etc.) to obtain received symbols. A MIMO detector 1056 may obtain received symbols from the modulator/demodulators 1054 and 1055, perform MIMO detection on the received symbols, if applicable, and provide detected symbols. A receive (Rx) processor 1058 may process (e.g., demodulate, deinterleave, and decode) the detected symbols, providing decoded data for the UE 104 to a data output, and provide decoded control information to a processor 1080, or memory 1082.

The processor 1080 may in some cases execute stored instructions to instantiate a communicating component 242 (see e.g., FIGS. 1 and 2).

On the uplink (UL), at the UE 104, a transmit processor 1064 may receive and process data from a data source. The transmit processor 1064 may also generate reference symbols for a reference signal. The symbols from the transmit processor 1064 may be precoded by a transmit MIMO processor 1066 if applicable, further processed by the modulator/demodulators 1054 and 1055 (e.g., for SC-FDMA, etc.), and be transmitted to the base station 102 in accordance with the communication parameters received from the base station 102. At the base station 102, the UL signals from the UE 104 may be received by the antennas 1034 and 1035, processed by the modulator/demodulators 1032 and 1033, detected by a MIMO detector 1036 if applicable, and further processed by a receive processor 1038. The receive processor 1038 may provide decoded data to a data output and to the processor 1040 or memory 1042.

The processor 1040 may in some cases execute stored instructions to instantiate a handover component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 1000. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1000.

SOME FURTHER EXAMPLES

In one example, a method for wireless communication includes receiving multiple synchronization signal blocks (SSBs) from a target cell over a measurement time window, identifying a repeating beam index for one or more of the multiple SSBs, wherein identifying the repeating beam index is based at least in part on a determination of a repeat parameter indicating a number of beams in a SSB pattern for the target cell, associating a beam set of the one or more of the multiple SSBs determined to have the same repeating beam index, measuring one or more parameters of the one or more of the multiple SSBs of the beam set, and reporting, to a serving cell, a measurement of the one or more parameters of beam set for the target cell.

In one or more of the above examples, the determination of the repeat parameter includes receiving, from a serving cell, an indication of the repeat parameter for at least one of cells associated with a frequency or one or more lists of cells within or across a frequency.

One or more of the above examples can further include reporting, to a serving cell, the repeat parameter received from a broadcast channel of the target cell based on serving cell configuration.

One or more of the above examples can further include reporting, to a serving cell, one or more target cells from which SSBs are received and for which the repeat parameter is not determined.

One or more of the above examples can further include determining the one or more of the multiple SSBs to have a threshold signal strength, and wherein the determination of the repeat parameter includes decoding, based on the one or more of the multiple SSBs having the threshold signal strength, a broadcast channel of the target cell.

One or more of the above examples can further include wherein reporting the measurement comprises filtering measurements of two or more of the multiple SSBs in the beam set having a signal strength that achieves a threshold.

One or more of the above examples can further include wherein reporting the beam measurements and evaluation of cell quality comprises determining at least one of an average value of the one or more parameters for the two or more of the multiple SSBs, a maximum value of the one or more parameters for the two or more of the multiple SSBs, a random selection of a value of the one or more parameters for the two or more of the multiple SSBs, or all values of the one or more parameters for the two or more of the multiple SSBs.

One or more of the above examples can further include receiving, from a serving cell, at least one of an indication to measure outside the measurement window associated with a frequency, an indication of an additional measurement time window or a listing of cells, including the target cell, to measure within the additional measurement time window.

One or more of the above examples can further include receiving, from the serving cell, at least one of an indication of a gap duration for measuring at least the target cell in the measurement time window, a gap periodicity or offset for starting measuring, or an activation or deactivation command to start or stop the measuring in the gap duration.

One or more of the above examples can further include receiving an indication of whether the repeat parameter is restricted to being in a set of one or more values.

One or more of the above examples can further include determining whether the repeat parameter is restricted to being in the set of one or more values based at least in part on the indication and on whether the target cell is in synchronization with the serving cell One or more of the above examples can further include receiving, from one of the serving cell or broadcast channel of target cell, an indication of quasi-colocation between two SSBs including one SSB in the beam set and one SSB outside of the beam set, wherein measuring the one or more parameters comprises measuring the one or more parameters of the one or more SSBs in the beam set and the one or more SSBs outside of the beam set, and wherein reporting the measurement comprises reporting a combined measurement of the one or more parameters of the one or more SSBs in the beam set and the one or more SSBs outside of the beam set.

One or more of the above examples can further include wherein identifying the SSB occasion and repeating beam index is further based at least in part on receiving, from a serving cell, identity of a reference cell and an offset between measurement time windows of the target cell and the reference cell, and further comprising receiving, from the serving cell, a synchronization indication that the reference cell and at least the target cell are substantially synchronized in time.

One or more of the above examples can further include wherein the reference cell can be a serving cell.

One or more of the above examples can further include wherein the synchronization indication indicates the reference cell and target cell are synchronized within a half slot duration, and further comprising determining the SSB occasion and the beam index of target cell based at least in part on at least one of a time instance of synchronization signal detection from the target cell or a time offset between a measurement window of the reference cell and the target cell.

One or more of the above examples can further include wherein the synchronization indication indicates the reference cell and target cell are synchronized within a number of slots greater than a half slot duration, and further comprising determining the SSB occasion and the beam index based of the target cell at least in part on at least one of a time instance of synchronization signal detection from the target cell, a time offset between a measurement window of the reference cell and the target cell, or a decoded demodulation reference signal sequence of a broadcast channel of the target cell.

One or more of the above examples can further include determining the one or more of the multiple SSBs to have a threshold signal strength, and wherein the determination of the repeat parameter includes decoding, based on the one or more of the multiple SSBs having the threshold signal strength, a broadcast channel of the target cell.

One or more of the above examples can further include wherein reporting the measurement comprises filtering measurements of two or more of the multiple SSBs in the beam set having a signal strength that achieves a threshold.

One or more of the above examples can further include wherein reporting the measurement comprises reporting at least one of an average value of the one or more parameters for the two or more of the multiple SSBs, a maximum value of the one or more parameters for the two or more of the multiple SSBs, a random selection of a value of the one or more parameters for the two or more of the multiple SSBs, or all values of the one or more parameters for the two or more of the multiple SSBs.

One or more of the above examples can further include wherein the determination of the repeat parameter is unsuccessful, and further comprising reporting the measurement based on a detected reporting trigger.

One or more of the above examples can further include receiving, from a serving cell, an indication of the detected reporting trigger.

One or more of the above examples can further include wherein the detected reporting trigger is detected based at least in part on comparing the measurement of a beam set to one or more thresholds and/or to a measurement of a serving cell.

One or more of the above examples can further include wherein reporting the measurement comprises reporting, based on the determination of the repeat parameter being unsuccessful, the measurement as at least one of an average value of the measurement and a measurement of other SSBs in the multiple SSBs over multiple measurement time windows, a maximum value of the measurement and a measurement of other SSBs in the multiple SSBs over multiple measurement time windows, all values of the measurement and a measurement of other SSBs in the multiple SSBs over multiple measurement time windows that achieve a threshold.

One or more of the above examples can further include wherein reporting the measurement comprises reporting, based on the determination of the repeat parameter being unsuccessful, the measurement along with a demodulation reference signal sequence of broadcast channel and time offset value from a reference time.

One or more of the above examples can further include wherein the time offset value corresponds to the measurement timing window of a serving cell or a reference cell indicated by serving cell.

One or more of the above examples can further include wherein reporting the measurement comprises reporting, based on the determination of the repeat parameter being unsuccessful, the measurement along with a demodulation reference signal (DM-RS) sequence of a broadcast channel and an indication that the reporting identity is the DM-RS sequence.

One or more of the above examples can further include wherein associating the beam set comprises associating, based on the determination of the repeat parameter being unsuccessful, a first beam set based on a first hypothesis for the repeat parameter and a second beam set based on a second hypothesis for the repeat parameter, wherein reporting comprises reporting the measurement for the first beam set along with an indication of the first hypothesis and the second beam set along with an indication of the second hypothesis.

One or more of the above examples can further include receiving, from a serving cell, at least one of an indication to measure outside the measurement window associated with a frequency, an indication of an additional measurement time window or a listing of cells, including the target cell, to measure within the additional measurement time window.

One or more of the above examples can further include receiving, from the serving cell, at least one of an indication of a gap duration for measuring at least the target cell in the measurement time window, a gap periodicity or offset for starting measuring, or an activation or deactivation command to start or stop the measuring in the gap duration.

One or more of the above examples can further include receiving an indication of whether the repeat parameter is restricted to being in a set of one or more values.

One or more of the above examples can further include determining whether the repeat parameter is restricted to being in the set of one or more values based at least in part on the indication and on whether the target cell is in synchronization with the serving cell.

In one example, a method for wireless communication includes receiving, from a user equipment (UE) at a serving cell, a reporting of a measurement of one or more parameters of a beam set of a target cell, and processing, by the serving cell, the measurement for determining whether to handover the UE to the target cell based at least in part on whether a repeat parameter, for determining a repeating beam index, is determinable by the UE.

One or more of the above examples can further include indicating, in a measurement configuration, the repeat parameter for at least one of a list of cells within or across a frequency or all cells operating within a frequency.

One or more of the above examples can further include receiving an indication of the repeat parameter from the target cell.

One or more of the above examples can further include receiving the repeat parameter for the target cell from the UE based on configuring the UE to report the repeat parameter.

One or more of the above examples can further include indicating, to the UE, identity of a reference cell, a list of cells, including the target cell, that are synchronized in time with the reference cell and a time offset of measurement window of target cell and reference cell.

One or more of the above examples can further include indicating, to the UE, whether the reference cell and the target cell are synchronized within one or more threshold time durations.

One or more of the above examples can further include wherein the repeat parameter is determinable by the UE, and wherein processing the measurement is based at least in part on processing the measurement as at least one of an average value of the one or more parameters for the beam set, a maximum value of the one or more parameters for the beam set, a random selection of a value of the one or more parameters for the beam set, or all values of the one or more parameters for the beam set.

One or more of the above examples can further include wherein the repeat parameter is not determinable by the UE, and further comprising configuring one or more beam set based reporting triggers for the UE for reporting beam measurements.

One or more of the above examples can further include wherein the one or more reporting triggers are based at least in part on comparing the measurement of a beam set to one or more thresholds and/or to a measurement of a serving cell.

One or more of the above examples can further include wherein the repeat parameter is not determinable by the UE, and wherein processing the measurement comprises processing the measurement as at least one of an average value of the measurement and a measurement of other SSBs over multiple measurement time windows, a maximum value of the measurement and a measurement of other SSBs over multiple measurement time windows, all values of the measurement and a measurement of other SSBs over multiple measurement time windows that achieve a threshold.

One or more of the above examples can further include wherein the repeat parameter is not determinable by the UE, and wherein the one or more parameters include a demodulation reference signal (DM-RS) sequence of a broadcast channel and time offset value from a reference time.

One or more of the above examples can further include wherein the time offset value corresponds to the measurement timing window of a serving cell or a reference cell indicated by serving cell.

One or more of the above examples can further include wherein processing the measurement is based at least in part on decoding a beam index for the beam set based on the DM-RS sequence of a broadcast channel and the time offset value.

One or more of the above examples can further include forwarding the DM-RS sequence and the time offset value to the target cell.

One or more of the above examples can further include wherein the repeat parameter is not determinable by the UE, and wherein the one or more parameters include a demodulation reference signal (DM-RS) sequence of a broadcast channel and an indication that the reporting identity is the DM-RS sequence.

One or more of the above examples can further include wherein processing the measurement is based at least in part on decoding a beam index for the beam set based on the DM-RS sequence.

One or more of the above examples can further include forwarding the DM-RS sequence to the target cell.

One or more of the above examples can further include wherein receiving the reporting of the measurement comprises receiving a first measurement for a first beam set based on a first hypothesis for the repeat parameter along with the first hypothesis and a second measurement for a second beam set based on a second hypothesis for the repeat parameter along with the second hypothesis, wherein processing the measurement is based on the value for the repeat parameter of the target cell.

One or more of the above examples can further include wherein receiving the reporting of the measurement comprises receiving a first measurement for a first beam set based on a first hypothesis for the repeat parameter and a second measurement for a second beam set based on a second hypothesis for the repeat parameter, and further comprising indicating the first measurement, the first hypothesis, the second measurement, and the second hypothesis to the target cell.

One or more of the above examples can further include indicating, to the UE, at least one of an indication to measure outside the measurement window associated with a frequency, an indication of an additional measurement time window or a listing of cells, including the target cell, to measure within the additional measurement time window.

One or more of the above examples can further include indicating, to the UE, at least one of an indication of a gap duration for measuring at least the target cell in the measurement time window, a gap periodicity or offset for starting measuring, or an activation or deactivation command to start or stop the measuring in the gap duration.

One or more of the above examples can further include transmitting an indication of whether the repeat parameter is restricted to being in a set of one or more values.

In one example, a method for wireless communication includes configuring a number of synchronization signal blocks (SSBs) for transmitting based on different beams, determining that the number of beams is not a factor of a configured value, and transmitting one or more of the number of SSBs as one or more additional beams to achieve a new number of beams that is a factor of the configured value.

One or more of the above examples can further include wherein the configured value is a number of demodulation reference signal sequences.

One or more of the above examples can further include transmitting an indication of quasi-colocation between the multiple transmissions of the one or more of the number of SSBs.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   receiving a burst of synchronization signal blocks (SSBs) from a cell;
   receiving, for a list of multiple cells including the cell, an indication of a repeat parameter identifying a number of beams in a repeating pattern of beams transmitted by the multiple cells; and
   associating a subset of the burst of SSBs, including multiple SSBs having a same repeating beam index computed based on the repeat parameter for the cell, as having a same measurement value.

2. The method of claim 1, further comprising identifying, for each SSB in the burst of SSBs, a repeating beam index based at least in part on the repeat parameter.

3. The method of claim 1, wherein the receiving the indication includes receiving the indication from a serving cell.

4. The method of claim 1, wherein the indication of the repeat parameter is for the list of multiple cells that are associated with a frequency.

5. The method of claim 1, wherein the indication of the repeat parameter is for the list of multiple cells that are within or across a frequency.

6. The method of claim 1, further comprising reporting, to a serving cell, the repeat parameter received from a broadcast channel of the cell based on serving cell configuration.

7. The method of claim 1, further comprising reporting, to a serving cell and based on the associating the subset of the burst of SSBs, the same measurement value, wherein the same measurement value corresponds to one or more parameters of the subset of the burst of SSBs.

8. The method of claim 7, wherein the reporting the same measurement value comprises filtering measurements of the subset of the burst of SSBs having a signal strength that achieves a threshold.

9. The method of claim 1, further comprising receiving an indication of whether the repeat parameter is restricted to being in a set of one or more values.

10. An apparatus for wireless communication, comprising:
a transceiver;
a memory configured to store instructions; and
one or more processors communicatively coupled with the transceiver and the memory, wherein the one or more processors are configured to:
receive a burst of synchronization signal blocks (SSBs) from a cell;
receive, for a list of multiple cells including the cell, an indication of a repeat parameter identifying a number of beams in a repeating pattern of beams transmitted by the multiple cells; and
associate a subset of the burst of SSBs, including multiple SSBs having a same repeating beam index that is based on the repeat parameter for the cell, as having a same measurement value.

11. The apparatus of claim 10, wherein the one or more processors are configured to identify, for each SSB in the burst of SSBs, a repeating beam index based at least in part on the repeat parameter.

12. The apparatus of claim 10, wherein the one or more processors are configured to receive the indication from a serving cell.

13. The apparatus of claim 10, wherein the indication of the repeat parameter is for the list of multiple cells that are associated with a frequency.

14. The apparatus of claim 10, wherein the indication of the repeat parameter is for the list of multiple cells that are within or across a frequency.

15. The apparatus of claim 10, wherein the one or more processors are configured to report, to a serving cell, the repeat parameter received from a broadcast channel of the cell based on serving cell configuration.

16. The apparatus of claim 10, wherein the one or more processors are configured to report, to a serving cell and based on the associating the subset of the burst of SSBs, the same measurement value, wherein the same measurement value corresponds to one or more parameters of the subset of the burst of SSBs.

17. The apparatus of claim 16, wherein the one or more processors are configured to report the same measurement value at least in part by filtering measurements of the subset of the burst of SSBs having a signal strength that achieves a threshold.

18. The apparatus of claim 10, wherein the one or more processors are configured to receive an indication of whether the repeat parameter is restricted to being in a set of one or more values.

19. An apparatus for wireless communication, comprising:
means for receiving a burst of synchronization signal blocks (SSBs) from a cell;
means for receiving, for a list of multiple cells including the cell, an indication of a repeat parameter identifying a number of beams in a repeating pattern of beams transmitted by the multiple cells; and
means for associating a subset of the burst of SSBs, including multiple SSBs having a same repeating beam index computed based on the repeat parameter for the cell, as having a same measurement value.

20. The apparatus of claim 19, further comprising means for identifying, for each SSB in the burst of SSBs, a repeating beam index based at least in part on the repeat parameter.

21. The apparatus of claim 19, wherein the means for receiving the indication receives the indication from a serving cell.

22. The apparatus of claim 19, wherein the indication of the repeat parameter is for the list of multiple cells that are associated with a frequency.

23. The apparatus of claim 19, wherein the indication of the repeat parameter is for the list of multiple cells that are within or across a frequency.

24. The apparatus of claim 19, further comprising means for reporting, to a serving cell, the repeat parameter received from a broadcast channel of the cell based on serving cell configuration.

25. A non-transitory computer-readable medium, comprising code executable by one or more processors for wireless communication, the code comprising code for:
receiving a burst of synchronization signal blocks (SSBs) from a cell;
receiving, for a list of multiple cells including the cell, an indication of a repeat parameter identifying a number of beams in a repeating pattern of beams transmitted by the multiple cells; and
associating a subset of the burst of SSBs, including multiple SSBs having a same repeating beam index computed based on the repeat parameter for the cell, as having a same measurement value.

26. The non-transitory computer-readable medium of claim 25, further comprising code for identifying, for each SSB in the burst of SSBs, a repeating beam index based at least in part on the repeat parameter.

27. The non-transitory computer-readable medium of claim 25, wherein the code for receiving the indication comprises code for receiving the indication from a serving cell.

28. The non-transitory computer-readable medium of claim 25, wherein the indication of the repeat parameter is for the list of multiple cells that are associated with a frequency.

29. The non-transitory computer-readable medium of claim 25, wherein the indication of the repeat parameter is for the list of multiple cells that are within or across a frequency.

30. The non-transitory computer-readable medium of claim 25, further comprising code for reporting, to a serving cell, the repeat parameter received from a broadcast channel of the cell based on serving cell configuration.

* * * * *